United States Patent
Li et al.

(10) Patent No.: US 11,838,106 B2
(45) Date of Patent: Dec. 5, 2023

(54) SYNCHRONIZATION METHOD AND APPARATUS

(71) Applicant: Huawei Technologies Co., Ltd., Shenzhen (CN)

(72) Inventors: Yongcui Li, Beijing (CN); Yan Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 215 days.

(21) Appl. No.: 17/326,033

(22) Filed: May 20, 2021

(65) Prior Publication Data

US 2021/0273736 A1    Sep. 2, 2021

Related U.S. Application Data

(63) Continuation of application No. PCT/CN2019/105142, filed on Sep. 10, 2019.

(30) Foreign Application Priority Data

Nov. 21, 2018  (CN) .......................... 201811393993.8
Jan. 14, 2019  (CN) .......................... 201910032550.4

(51) Int. Cl.
*H04J 3/06*      (2006.01)
*H04W 76/12*   (2018.01)
(Continued)

(52) U.S. Cl.
CPC .......... *H04J 3/0667* (2013.01); *H04W 48/18* (2013.01); *H04W 56/001* (2013.01);
(Continued)

(58) Field of Classification Search
None
See application file for complete search history.

(56) References Cited

U.S. PATENT DOCUMENTS

2018/0184438 A1    6/2018   Cavalcanti et al.
2018/0242267 A1*   8/2018   Jiang ...................... H04W 56/00
(Continued)

FOREIGN PATENT DOCUMENTS

CN     106789434 A    5/2017
CN     108156023 A    6/2018
(Continued)

OTHER PUBLICATIONS

"Fixed Delay QoS Class for Time Synchronization Support of 3GPP Network," SA WG2 Meeting #129, Dongguan, China, S2-1810338, pp. 1-7, 3rd Generation Partnership Project, Valbonne, France (Oct. 15-19, 2018).

"IEEE Standard for a Precision Clock Synchronization Protocol for Networked Measurement and Control Systems," IEEE Instrumentation and Measurement Society, IEEE Std 1588-2008 (Revision of IEEE Std 1588-2002), Total 289 pages, Institute of Electrical and Electronics Engineers, New York, New York (Jul. 2008).

(Continued)

*Primary Examiner* — Hong Shao
(74) *Attorney, Agent, or Firm* — Leydig, Voit & Mayer, Ltd.

(57) ABSTRACT

This application provides a synchronization method and an apparatus, to implement synchronization with a TSN clock in a mobile network. The synchronization method is performed by a first network element in a relay network. The relay network includes a radio access network RAN device and a terminal device. The method includes: The first network element receives a clock synchronization packet. The first network element determines first duration of the relay network, where the first duration of the relay network includes a first downlink transmission delay of transmitting the clock synchronization packet between the RAN device and the terminal device. The first network element determines a time correction field of the relay network, where the time correction field includes the first downlink transmission delay.

18 Claims, 20 Drawing Sheets

(51) Int. Cl.
H04W 76/11 (2018.01)
H04W 48/18 (2009.01)
H04W 56/00 (2009.01)
H04W 92/10 (2009.01)

(52) U.S. Cl.
CPC ............ H04W 76/11 (2018.02); H04W 76/12 (2018.02); H04W 92/10 (2013.01)

(56) References Cited

U.S. PATENT DOCUMENTS

| | | | |
|---|---|---|---|
| 2018/0276891 A1 | 9/2018 | Craner | |
| 2021/0337609 A1* | 10/2021 | Ramle | H04W 76/25 |

FOREIGN PATENT DOCUMENTS

| | | |
|---|---|---|
| CN | 108347763 A | 7/2018 |
| CN | 108574969 A | 9/2018 |
| CN | 108736999 A | 11/2018 |
| WO | 2017222344 A1 | 12/2017 |
| WO | 2018137413 A1 | 8/2018 |

OTHER PUBLICATIONS

"Evaluation of Solution #1: Redundant user plane paths based on dual connectivity," 3GPP TSG-SA WG2 Meeting #129, Dongguan, P.R. China, S2-1811378 (revision of 18xxxx), pp. 1-8, 3rd Generation Partnership Project, Valbonne, France (Oct. 15-19, 2018).
"3rd Generation Partnership Project; Technical Specification Group Services and System Aspects; System Architecture for the 5G System; Stage 2 (Release 15)," 3GPP TS 23.501 V15.3.0, pp. 1-226, 3rd Generation Partnership Project, Valbonne, France (Sep. 2018).
"Draft Standard for Local and Metropolitan Area Networks—Timing and Synchronization for Time-Sensitive Applications," IEEE P802.1AS-Rev/D7.3, pp. 1-502, Institute of Electrical and Electronics Engineers, New York, New York (Aug. 2, 2018).
"Time-Sensitive Networking Task Group," Retrieved from https://www.ieee802.org/1/pages/tsn.html, pp. 1-4, Institute of Electrical and Electronics Engineers, New York, New York (May 19, 2021).
"3rd Generation Partnership Project; Technical Specification Group Services and System Aspects; Procedures for the 6G System; Stage 2 (Release 15)," 3GPP TS 23.502 V15.3.0, pp. 1-330, 3rd Generation Partnership Project, Valbonne, France (Sep. 2018).

* cited by examiner

SYNCHRONIZATION METHOD AND APPARATUS

CROSS-REFERENCE TO RELATED APPLICATIONS

This application is a continuation of International Application No. PCT/CN2019/105142, filed on Sep. 10, 2019, which claims priority to Chinese Patent Application No. 201910032550.4, filed on Jan. 14, 2019 and Chinese Patent Application No. 201811393993.8, filed on Nov. 21, 2018. All of the aforementioned patent applications are hereby incorporated by reference in their entireties.

TECHNICAL FIELD

This application relates to the communications field, and more specifically, to a synchronization method and an apparatus in the communications field.

BACKGROUND

In most industrial scenarios, such as factory automation, there are strict requirements on a delay, jitter, an error rate, and the like. To satisfy the requirements in the industrial scenarios, the Institute of Electrical and Electronics Engineers (IEEE) develops an Ethernet network, namely, a time sensitive networking (TSN), that can be used in an industrial factory. In the TSN network, the 802.1AS protocol is used to satisfy a high-precision time synchronization requirement. A mobile network may also be applied to the industrial scenario, that is, a terminal in the mobile network needs to be synchronized with a TSN clock.

Therefore, how to implement synchronization with the TSN clock in the mobile network is a problem to be urgently resolved.

SUMMARY

This application provides a synchronization method and an apparatus, to implement synchronization with a TSN clock in a mobile network.

According to a first aspect, a synchronization method is provided. The method is performed by a first network element in a relay network, and the relay network includes a radio access network (RAN) device and a terminal device. The method includes:

The first network element receives a clock synchronization packet.

The first network element determines first duration of the relay network. The first duration of the relay network includes a first downlink transmission delay of transmitting the clock synchronization packet between the RAN device and the terminal device.

The first network element determines a time correction field of the relay network. The time correction field includes the first downlink transmission delay.

In this embodiment of this application, the first network element may determine the time correction field of the relay network based on the clock synchronization packet. The time correction field includes the corresponding first downlink transmission delay of transmitting the clock synchronization packet between the RAN device and the terminal device. This helps implement clock synchronization between the terminal device or an endpoint device and an external clock by using a TSN clock synchronization mechanism in a mobile network.

With reference to the first aspect, in some implementations of the first aspect, the clock synchronization packet is used to trigger the first network element to determine the first duration of the relay network. In this way, after the first network element identifies that a received packet is a SYNC packet, the SYNC packet may trigger the first network element to determine residence duration of the relay network.

With reference to the first aspect, in some implementations of the first aspect, the time correction field further includes a second downlink transmission delay between a node device sending the clock synchronization packet and the relay network. In this way, in the mobile network, the TSN clock synchronization mechanism may be used to perform clock synchronization between the terminal device or the endpoint device and the external clock.

With reference to the first aspect, in some implementations of the first aspect, the relay network further includes a user plane function (UPF). The first duration further includes a third downlink transmission delay between the UPF and the RAN device.

In this embodiment of this application, when the relay network includes the UPF, the RAN, and the terminal device, the first network element may be the UPF, the RAN, or the terminal device. When the relay network includes the RAN and the terminal device, the first network element may be the RAN or the terminal device.

With reference to the first aspect, in some implementations of the first aspect, the first duration is a sum of the first downlink transmission delay and the third downlink transmission delay.

With reference to the first aspect, in some implementations of the first aspect, the first network element is the UPF, and that the first network element determines first duration of the relay network includes:

The UPF obtains the third downlink transmission delay.

The UPF sends the clock synchronization packet and first indication information to the RAN device. The first indication information indicates the RAN device to obtain the first downlink transmission delay.

The UPF receives the first downlink transmission delay from the RAN device.

The UPF determines the first duration based on the first downlink transmission delay and the third downlink transmission delay.

Correspondingly, the RAN device receives the clock synchronization packet and the first indication information that are sent by the UPF device, determines the first downlink transmission delay based on the clock synchronization packet and the first indication information, and then sends the first downlink transmission delay to the UPF device.

Therefore, in this embodiment of this application, the terminal device, the RAN, and the UPF are used as the relay network, and the UPF in the relay network determines an "internal delay" of transmitting the SYNC packet in the relay network, namely, duration from receiving the SYNC packet by the UPF to receiving the SYNC packet by the terminal device, so that time synchronization between the terminal device (or a TSN endpoint device connected to the terminal device) and a TSN clock source is implemented.

With reference to the first aspect, in some implementations of the first aspect, the first indication information includes a first quality of service flow identifier (QFI), and the first indication information indicates the RAN device to obtain, when receiving a packet corresponding to the first QFI, the first downlink transmission delay.

Herein, the first QFI is a special QFI. In other words, a QoS flow packet corresponding to the first QFI is a clock synchronization packet, for example, a SYNC packet. In other words, when the packet received by the RAN includes the first QFI, the RAN may identify the packet as the SYNC packet, and then may be triggered to measure the first downlink transmission delay.

With reference to the first aspect, in some implementations of the first aspect, that the first network element determines first duration of the relay network includes:

The first network element determines the first duration of the relay network based on policy information. The policy information is information configured on the first network element, or the policy information is information received from an SMF.

Specifically, when the relay network includes the RAN device and the terminal device, in this case, the first network element may be the RAN. When the relay network includes the UPF device, the RAN device, and the terminal device, in this case, the first network element may be the UPF device or the RAN device.

With reference to the first aspect, in some implementations of the first aspect, the first network element is the RAN device, and that the first network element determines first duration of the relay network includes:

The RAN device receives second indication information. The second indication information indicates the RAN device to obtain the first duration.

The RAN obtains the first downlink transmission delay and the third downlink transmission delay based on the second indication information.

The RAN determines the first duration based on the first downlink transmission delay and the third downlink transmission delay.

Therefore, in this embodiment of this application, the terminal device, the RAN, and the UPF are used as the relay network, and the RAN in the relay network determines an "internal delay" of transmitting the SYNC packet in the relay network, namely, duration from receiving the SYNC packet by the UPF to receiving the SYNC packet by the terminal device, so that time synchronization between the terminal device (or a TSN endpoint device connected to the terminal device) and a TSN clock source is implemented.

With reference to the first aspect, in some implementations of the first aspect, the second indication information includes a second QFI, and the second indication information indicates the RAN device to obtain, when receiving a packet corresponding to the second QFI, the first duration.

A QoS flow packet corresponding to the second QFI is the clock synchronization packet, namely, the SYNC packet. In other words, when the packet received by the RAN includes the second QFI, the RAN may identify the packet as the SYNC packet, and then may be triggered to obtain the residence duration of the relay network.

With reference to the first aspect, in some implementations of the first aspect, that the first network element determines the first duration includes:

The first network element determines the first duration based on a ratio of a frequency of the first network element to a frequency of the node device sending the clock synchronization packet.

With reference to the first aspect, in some implementations of the first aspect, the method further includes: The first network element sends a message to the terminal device. The message carries the time correction field.

According to a second aspect, a synchronization method is provided. The method is performed by a RAN device in a relay network, and the relay network includes a UPF device, the RAN device, and a terminal device. The method includes:

The RAN device receives a clock synchronization packet and first indication information that are sent by the UPF device. The first indication information indicates the RAN device to obtain a first downlink transmission delay. The first downlink transmission delay is a delay of transmitting the clock synchronization packet between the RAN device and the terminal device.

The RAN device determines the first downlink transmission delay based on the clock synchronization packet and the first indication information The RAN device sends the first downlink transmission delay to the UPF device.

Therefore, in this embodiment of this application, the terminal device, the RAN, and the UPF are used as the relay network. When the UPF in the relay network determines an "internal delay" of transmitting the SYNC packet in the relay network, namely, duration from receiving the SYNC packet by the UPF to receiving the SYNC packet by the terminal device, the RAN device may be triggered to determine the first downlink transmission delay, to help implement time synchronization between the terminal device (or a TSN endpoint device connected to the terminal device) and a TSN clock source.

With reference to the second aspect, in some implementations of the second aspect, the first indication information includes a first QFI, and the first indication information is specifically used to indicate the RAN device to obtain, when receiving a packet corresponding to the first QFI, the first downlink transmission delay.

According to a third aspect, a synchronization apparatus is provided. The apparatus includes a module or a unit configured to perform the synchronization method in any one of the first aspect or the possible implementations of the first aspect.

According to a fourth aspect, a synchronization apparatus is provided. The apparatus includes a module or a unit configured to perform the synchronization method in any one of the second aspect or the possible implementations of the second aspect.

According to a fifth aspect, a synchronization apparatus is provided. The apparatus includes a processor and a transceiver. The processor is configured to execute a program. When the processor executes the program, the processor and the transceiver implement the synchronization method in any one of the first aspect or the possible implementations of the first aspect.

Optionally, the synchronization apparatus may further include a memory, and the memory is configured to store the program executed by the processor.

For example, the synchronization apparatus is a RAN device, a UPF device, or a terminal device.

According to a sixth aspect, a synchronization apparatus is provided. The apparatus includes a processor and a transceiver. The processor is configured to execute a program. When the processor executes the program, the processor and the transceiver implement the synchronization method in any one of the second aspect or the possible implementations of the second aspect.

Optionally, the synchronization apparatus may further include a memory, and the memory is configured to store the program executed by the processor.

For example, the synchronization apparatus is a RAN device.

According to a seventh aspect, a computer-readable storage medium is provided. The computer-readable storage medium stores program code to be executed by a synchronization apparatus, and the program code includes instructions used to implement the synchronization method in any one of the first aspect or the possible implementations of the first aspect.

According to an eighth aspect, a computer-readable storage medium is provided. The computer-readable storage medium stores program code to be executed by a synchronization apparatus, and the program code includes instructions used to implement the synchronization method in any one of the second aspect or the possible implementations of the second aspect.

According to a ninth aspect, a chip is provided. The chip includes a processor and a communications interface. The communications interface is configured to communicate with an external device. The processor is configured to implement the synchronization method in any one of the first aspect or the possible implementations of the first aspect.

Optionally, the chip may further include a memory. The memory stores instructions. The processor is configured to execute the instructions stored in the memory. When the instructions are executed, the processor is configured to implement the synchronization method in any one of the first aspect or the possible implementations of the first aspect.

Optionally, the chip may be integrated into a RAN device, a UPF device, or a terminal device.

According to a tenth aspect, a chip is provided. The chip includes a processor and a communications interface. The communications interface is configured to communicate with an external device. The processor is configured to implement the synchronization method in any one of the second aspect or the possible implementations of the second aspect.

Optionally, the chip may further include a memory. The memory stores instructions. The processor is configured to execute the instructions stored in the memory. When the instructions are executed, the processor is configured to implement the synchronization method in any one of the second aspect or the possible implementations of the second aspect.

Optionally, the chip may be integrated into a RAN device.

According to an eleventh aspect, a method for sending a packet is provided. The method includes:

A communications network element receives a first packet. The first packet includes a domain identifier. The domain identifier identifies a clock domain to which a node device sending the first packet belongs.

The communications network element determines, based on a correspondence between a domain identifier and a user plane connection identifier and further based on the domain identifier in the first packet, a user plane connection corresponding to the first packet.

The communications network element sends the first packet to a terminal device by using the user plane connection corresponding to the first packet.

With reference to the eleventh aspect, in some implementations of the eleventh aspect, the method further includes:

The communications network element receives, from an SMF, the correspondence between the domain identifier and the user plane connection identifier.

With reference to the eleventh aspect, in some implementations of the eleventh aspect, the communications network element is a UPF or a RAN.

With reference to the eleventh aspect, in some implementations of the eleventh aspect, the first packet is a clock synchronization packet.

With reference to the eleventh aspect, in some implementations of the eleventh aspect, the user plane connection identifier includes at least one of the following: a session identifier and user plane tunnel information.

According to a twelfth aspect, a method for sending a packet is provided. The method includes:

An SMF determines a correspondence between a domain identifier and a user plane connection identifier. The domain identifier identifies a clock domain to which a node device sending a first packet belongs.

The SMF sends the correspondence to a communications network element. The correspondence is used by the communications network element to determine a user plane connection used to send the first packet to a terminal device.

With reference to the twelfth aspect, in some implementations of the twelfth aspect, that an SMF determines a correspondence between a domain identifier and a user plane connection identifier includes:

The SMF obtains a correspondence between a terminal device identifier and the user plane connection identifier.

The SMF obtains a correspondence between the terminal device identifier and the domain identifier. The domain identifier identifies a clock domain corresponding to the terminal device.

The SMF determines the correspondence between the domain identifier and the user plane connection identifier based on the correspondence between the terminal device identifier and the user plane connection identifier and the correspondence between the terminal device identifier and the domain identifier.

With reference to the twelfth aspect, in some implementations of the twelfth aspect, that an SMF determines a correspondence between a domain identifier and a user plane connection identifier includes:

The SMF obtains a correspondence between the user plane connection identifier of the terminal device and a network identifier. The network identifier identifies a network accessed by the terminal device.

The SMF obtains a correspondence between the network identifier and the domain identifier. The domain identifier identifies a clock domain corresponding to the terminal device.

The SMF determines the correspondence between the domain identifier and the user plane connection identifier based on the correspondence between the user plane connection identifier and the network identifier and the correspondence between the network identifier and the domain identifier.

With reference to the twelfth aspect, in some implementations of the twelfth aspect, the network identifier includes at least one of the following: a data network name DNN and single network slice selection assistance information S-NSSAI.

With reference to the twelfth aspect, in some implementations of the twelfth aspect, the communications network element is a UPF or a RAN.

With reference to the twelfth aspect, in some implementations of the twelfth aspect, the first packet is a clock synchronization packet.

With reference to the twelfth aspect, in some implementations of the twelfth aspect, the user plane connection identifier includes at least one of the following: a session identifier and user plane tunnel information.

According to a thirteenth aspect, an apparatus for sending a packet is provided. The apparatus includes a module or a unit configured to perform the method for sending a packet in any one of the eleventh aspect or the possible implementations of the eleventh aspect.

According to a fourteenth aspect, an apparatus for sending a packet is provided. The apparatus includes a module or a unit configured to perform the method for sending a packet in any one of the twelfth aspect or the possible implementations of the twelfth aspect.

According to a fifteenth aspect, an apparatus for sending a packet is provided. The apparatus includes a processor and a transceiver. The processor is configured to execute a program. When the processor executes the program, the processor and the transceiver implement the synchronization method in any one of the first aspect or the possible implementations of the first aspect.

Optionally, the synchronization apparatus may further include a memory, and the memory is configured to store the program executed by the processor.

For example, the apparatus for sending a packet is a RAN device or a UPF device.

According to a sixteenth aspect, an apparatus for sending a packet is provided. The apparatus includes a processor and a transceiver. The processor is configured to execute a program. When the processor executes the program, the processor and the transceiver implement the method for sending a packet in any one of the twelfth aspect or the possible implementations of the twelfth aspect.

Optionally, the apparatus for sending a packet may further include a memory, and the memory is configured to store the program executed by the processor.

For example, the apparatus for sending a packet is an SMF device.

According to a seventeenth aspect, a computer-readable storage medium is provided. The computer-readable storage medium stores program code to be executed by an apparatus for sending a packet, and the program code includes instructions used to implement the synchronization method in any one of the eleventh aspect or the possible implementations of the eleventh aspect.

According to an eighteenth aspect, a computer-readable storage medium is provided. The computer-readable storage medium stores program code to be executed by an apparatus for sending a packet, and the program code includes instructions used to implement the synchronization method in any one of the twelfth aspect or the possible implementations of the twelfth aspect.

According to a nineteenth aspect, a chip is provided. The chip includes a processor and a communications interface. The communications interface is configured to communicate with an external device. The processor is configured to implement the method for sending a packet in any one of the eleventh aspect or the possible implementations of the eleventh aspect.

Optionally, the chip may further include a memory. The memory stores instructions. The processor is configured to execute the instructions stored in the memory. When the instructions are executed, the processor is configured to implement the method for sending a packet in any one of the eleventh aspect or the possible implementations of the eleventh aspect.

Optionally, the chip may be integrated into a RAN device or a UPF device.

According to a twentieth aspect, a chip is provided. The chip includes a processor and a communications interface. The communications interface is configured to communicate with an external device. The processor is configured to implement the method for sending a packet in any one of the twelfth aspect or the possible implementations of the twelfth aspect.

Optionally, the chip may further include a memory. The memory stores instructions. The processor is configured to execute the instructions stored in the memory. When the instructions are executed, the processor is configured to implement the method for sending a packet in any one of the twelfth aspect or the possible implementations of the twelfth aspect.

Optionally, the chip may be integrated into an SMF device.

DESCRIPTION OF EMBODIMENTS

The following describes technical solutions of this application with reference to the accompanying drawings.

Figure 1:
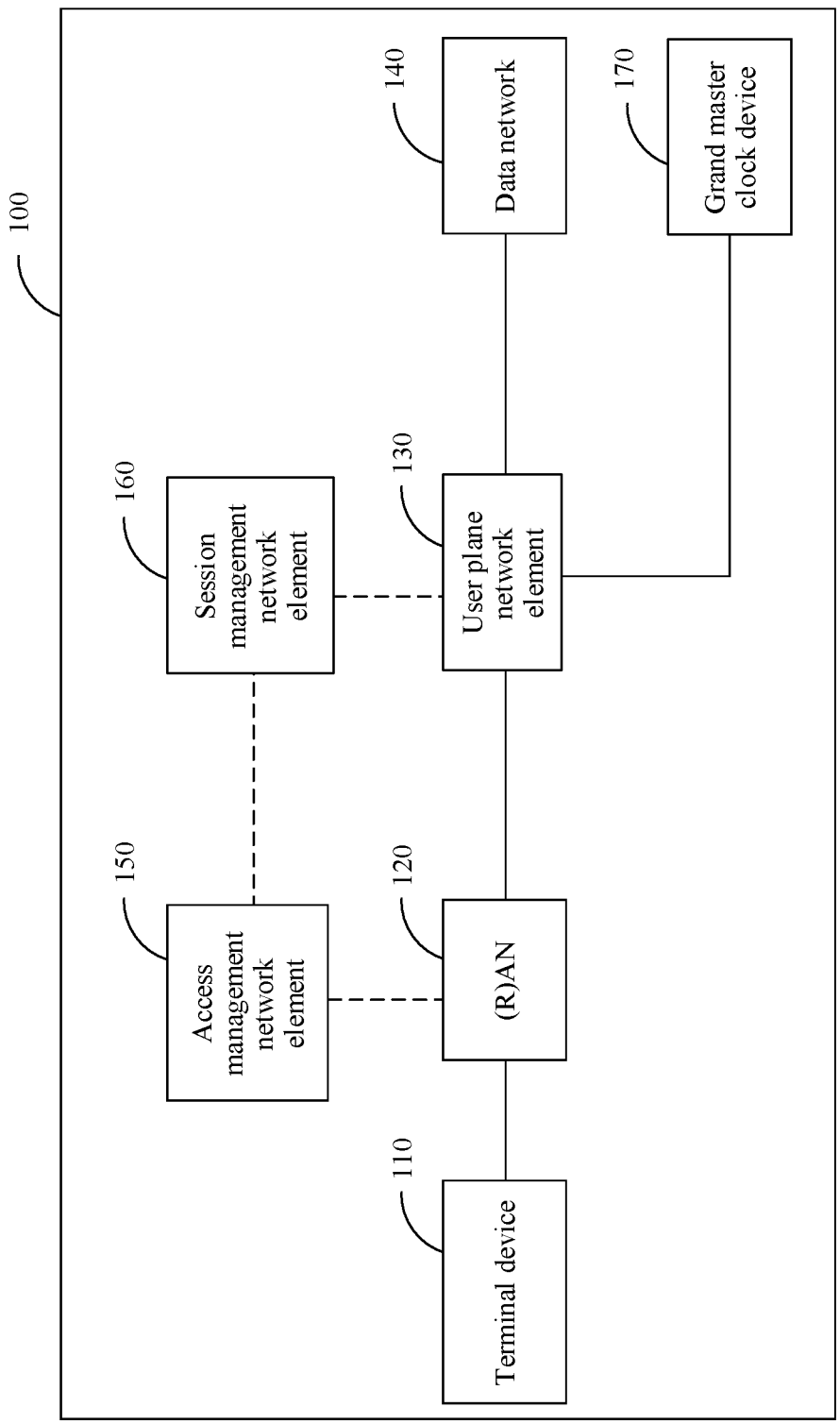
FIG. 1 is a schematic diagram of a network architecture applied to a method according to embodiment of this application.

FIG. 1 is a schematic diagram of a network architecture 100 applied to a method according to embodiments of this application. The following separately describes each part in the network architecture 100.

1. A terminal device 110 may include various handheld devices, vehicle-mounted devices, wearable devices, computing devices, Internet of Things terminal devices that have a wireless communication function, or other processing devices connected to a wireless modem, and terminals in various forms, such as a mobile station (MS), a terminal, user equipment (UE), and a soft client. For example, the terminal device 110 may be a water meter, an electricity meter, or a sensor.

2. A (radio) access network ((R)AN) network element 120 is configured to provide a network access function for authorized terminal devices in a specific area, and can use transmission tunnels with different quality based on levels of the terminal devices, service requirements, and the like.

The (R)AN network element can manage radio resources and provide an access service for a terminal device, to forward a control signal and terminal device data between the terminal device and a core network. The (R)AN network element may also be understood as a base station in a conventional network, and includes, but is not limited to an eNodeB, a WiFi AP, a WiMAX BS, and the like.

3. A user plane network element 130 is used for packet routing and forwarding, quality of service (QoS) processing of user plane data, and the like, and is mainly responsible for processing a user packet, such as forwarding and charging for the user packet.

In a 5G communications system, the user plane network element may be a user plane function (UPF) network element. In a future communications system, the user plane network element may still be a UPF network element, or may have another name. This is not limited in this application.

4. A data network 140 is an operator network configured to provide a data transmission service for a user, for example, an IP multimedia service (IMS) or the Internet.

In the 5G communications system, the data network may be referred to as a DN, or identified by using a DNN. In a future communications system, the data network may still be referred to as a DN, or may have another name. This is not limited in this application.

5. An access management network element 150 is mainly configured to perform mobility management, access management, and the like, and may be configured to implement another function, other than session management, in functions of a mobility management entity (MME). The another function is, for example, lawful interception, access authorization/authentication, user location update, network registration of a user, or user switching.

In the 5G communications system, the access management network element may be an access and mobility management function (AMF) network element. In a future communications system, the access management network element may still be an AMF network element, or may have another name. This is not limited in this application.

6. A session management network element 160 is mainly used for session management, for example, session establishment, modification, and release. A specific function is, for example, managing and allocating a Internet protocol (IP) address to a terminal device, selecting and managing a user plane function, a termination point of a policy control and charging function interface, and downlink data notification.

In the 5G communications system, the session management network element may be a session management function (SMF) network element. In a future communications system, the session management network element may still be an SMF network element, or may have another name. This is not limited in this application.

7. A grand master clock device 170 provides a synchronization grand master clock signal, so that a terminal device in a mobile communications system is synchronized with the synchronization grand master clock signal.

The grand master clock device 170 may be a TSN grand master clock device, and may be specifically a programmable logic controller (PLC). This is not limited in the embodiments of this application.

Optionally, the system architecture 100 shown in FIG. 1 may further include the following network elements.

8. A policy control network element is configured to guide a unified policy framework for network behavior, provide policy rule information for a control plane function network element (for example, an AMF or an SMF network element), and the like.

In a 4G communications system, the policy control network element may be a policy and charging rules function (PCRF) network element. In the 5G communications system, the policy control network element may be a policy control function (PCF) network element. In a future communications system, the policy control network element may still be a PCF network element, or may have another name. This is not limited in this application.

9. A data management network element is configured to process a terminal device identifier, perform access authentication, perform registration, and the like.

In the 5G communications system, the data management network element may be a unified data management (UDM) network element. In a future communications system, the unified data management may still be a UDM network element, or may have another name. This is not limited in this application.

It may be understood that the foregoing network element or function may be a network element in a hardware device, a software function running on dedicated hardware, or a virtualization function instantiated on a platform (for example, a cloud platform).

Further, a RAN network element is referred to as a RAN for short, a UPF network element is referred to as a UPF for short, an AMF network element is referred to as an AMF for short, and an SMF network element is referred to as an SMF for short. In addition, all RANs subsequently described in this application may be replaced with (R)AN network elements, all UPFs may be replaced with user plane network elements, all AMFs may be replaced with access management network elements, and all SMFs may be replaced with session management network elements.

For ease of description, in this application, an example in which an apparatus is a terminal device, a RAN, a UPF, an AMF, an SMF, or a TSN grand master clock device is used to describe a synchronization method. For an implementation when the apparatus is a chip in a terminal device, a chip in a RAN, a chip in a UPF, a chip in an AMF, a chip in an SMF, or a chip in a TSN grand master clock, refer to specific description of the example in which the apparatus is separately the terminal device, the RAN, the UPF, the AMF, the SMF, or the TSN grand master clock device, and details are not described again.

In a possible embodiment, in the network architecture shown in FIG. 1, a TSN clock synchronization mechanism may be used to synchronize a terminal device.

Figure 2:
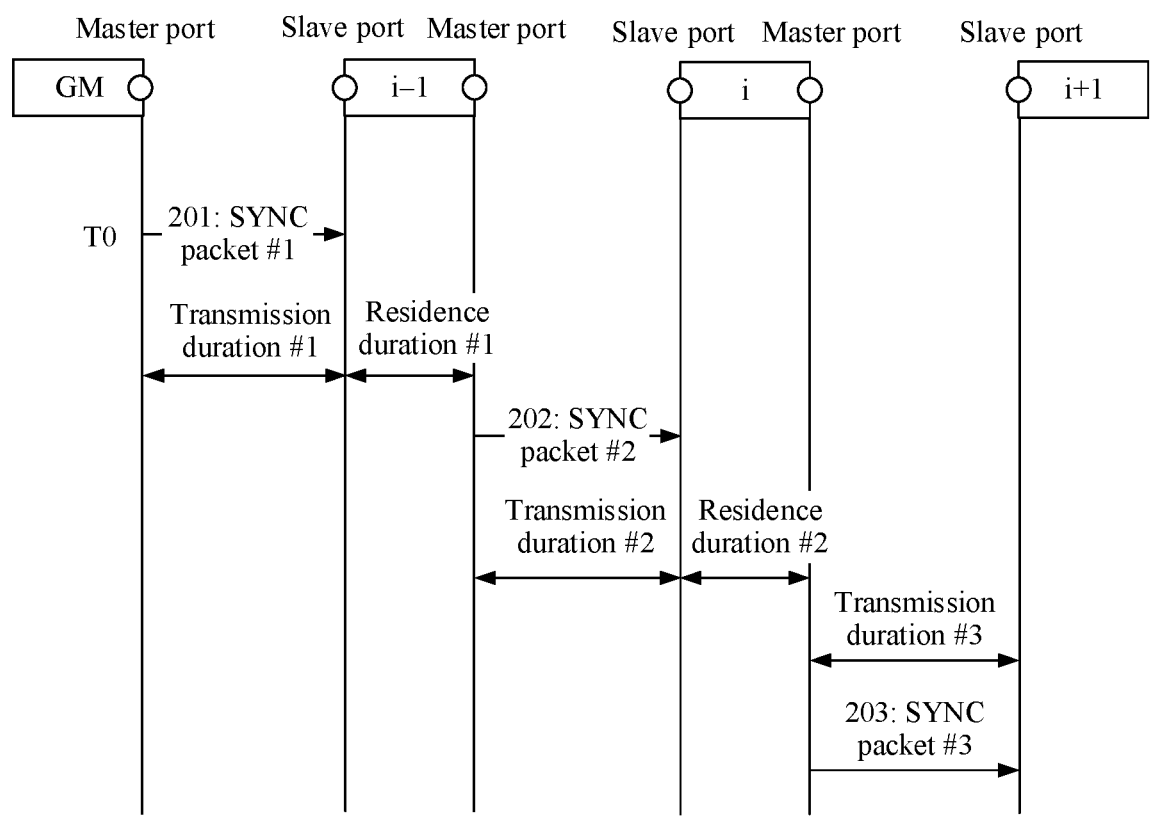
FIG. 2 is a conceptual diagram of a time synchronization method in 802.1AS.

FIG. 2 is a conceptual diagram of a time synchronization method in 802.1AS. In FIG. 2, four time-aware systems are included, which are respectively a grand master clock (GrandMaster, GM), (i−1), (i), and (i+1). Each time-aware system includes a master port and a slave port. In a time synchronization principle of the 802.1AS, each of the intermediate time-aware systems needs to correct a correction field (CF), where the CF is a time offset between a current node and the grand master clock, and the intermediate time-aware system is a node between the GM and a to-be-synchronized time-aware system.

An 802.1AS packet may be transmitted between the time-aware systems by using a two-step mechanism or a one-step mechanism. In the two-step mechanism, a parameter is transferred by using a synchronization (SYNC) packet and a follow-up packet. In the one-step mechanism, a parameter is transferred by using a SYNC packet.

The following describes how the intermediate node corrects the CF. For example, how the time-aware system (i+1) performs time synchronization with the GM is described.

201: The GM sends a SYNC packet #1 at a time point T0. Optionally, the SYNC packet #1 carries T0, a CF 1, and a frequency ratio ratio_GM. The CF 1 indicates a time offset between the GM and a previous-hop node. Because the SYNC packet #1 is sent by the GM, and there is no previous-hop node, the CF 1 is 0. A value of ratio_GM is 1, and ratio_GM may be understood as a ratio of a frequency of the GM to the frequency of the GM.

Correspondingly, an ingress port, namely, a slave port of (i−1) receives the SYNC packet #1.

202: An egress port, namely, a master port of (i−1) sends a SYNC packet #2. Optionally, the SYNC packet #2 carries T0, a CF 2, and a frequency ratio ratio_(i−1) between the GM and (i−1). The CF 2 indicates a time offset between (i−1) and the GM, and details are as follows:

CF 2=CF 1+Transmission duration #1+Residence duration #1×ratio_(i−1), where a time unit of the CF 2 is a time unit of the GM.

The transmission duration #1 indicates a transmission delay from sending the SYNC packet #1 by an egress port of the GM to receiving the SYNC packet #1 by the ingress port of (i−1), and a time unit of the transmission duration #1 is the time unit of the GM. The residence duration #1 indicates a processing delay from receiving the SYNC packet #1 by the ingress port of (i−1) to sending the SYNC packet #2 by the egress port, and a time unit of the residence duration #1 is a time unit of (i−1). That residence duration #1×ratio_(i−1) indicates that the time unit of the residence duration #1 is converted into the time unit of the GM.

Correspondingly, an ingress port, namely, a slave port of (i) receives the SYNC packet #2.

203: An egress port, namely, a master port of (i) sends a SYNC packet #3. Optionally, the SYNC packet #3 carries T0, a CF 3, and a frequency ratio ratio_(i) between the GM and (i). The CF 3 indicates a time offset between (i) and the GM, and details are as follows:

CF 3=(Transmission duration #2+Residence duration #2×ratio_NR)×ratio_(i−1)+CF 2, where a time unit of the CF 3 is the time unit of the GM.

ratio_(i)=ratio_(i−1)×ratio_NR. ratio_NR is a frequency ratio between (i−1) and (i), and ratio_(i) is the frequency ratio between the GM and (i).

The transmission duration #2 indicates a transmission delay from sending the SYNC packet #2 by the egress port of (i−1) to receiving the SYNC packet #2 by the ingress port of (i), and a time unit of the transmission duration #2 is the time unit of (i−1). The residence duration #2 indicates a processing delay from receiving the SYNC packet #2 by the ingress port of (i) to sending the SYNC packet #3 by the egress port, and a time unit of the residence duration #2 is a time unit of (i). That residence duration #2×ratio_NR indicates that the time unit of the residence duration #2 is converted into the time unit of (i−1). (Transmission duration #2+residence duration #2×ratio_NR)×ratio_(i−1) indicates that a time unit of the (transmission duration #2+residence duration #2×ratio_NR) is converted into the time unit of the GM.

Correspondingly, an ingress port, namely, a slave port of (i+1) receives the SYNC packet #3, and (i+1) performs synchronization based on the SYNC packet #3.

(i+1) is a to-be-synchronized node, and a time offset between (i+1) and the GM is calculated on the ingress port of (i+1). The time offset is recorded as a CF 4, and details are as follows:

CF 4=Transmission duration #3×ratio_(i)+CF 3, where a time unit of the CF 4 is the time unit of the GM.

The transmission duration #3 indicates a transmission delay from the egress port of (i) to the ingress port of (i+1), and a time unit of the transmission duration #3 is the time unit of (i).

A time point at which the ingress port of (i+1) is synchronized with the GM is T0+CF 4.

In this embodiment of this application, when the TSN clock synchronization mechanism is used in a mobile network to synchronize a time-aware endpoint device (time-aware end station), a network element in the mobile network (or a link between network elements in the mobile network) may be considered as a whole, and may be referred to as a relay network. In this case, the relay network may receive a clock synchronization packet (for example, the SYNC packet) from a TSN grand master clock device, and send the clock synchronization packet to the endpoint device. Herein, the clock synchronization packet sent by the relay network to the endpoint device includes a correction field CF, so that the endpoint device may be synchronized with the TSN grand master clock device based on the correction field CF. Herein, the endpoint device is a device that needs to be synchronized, for example, a factory device (for example, a sensor).

Figure 3:
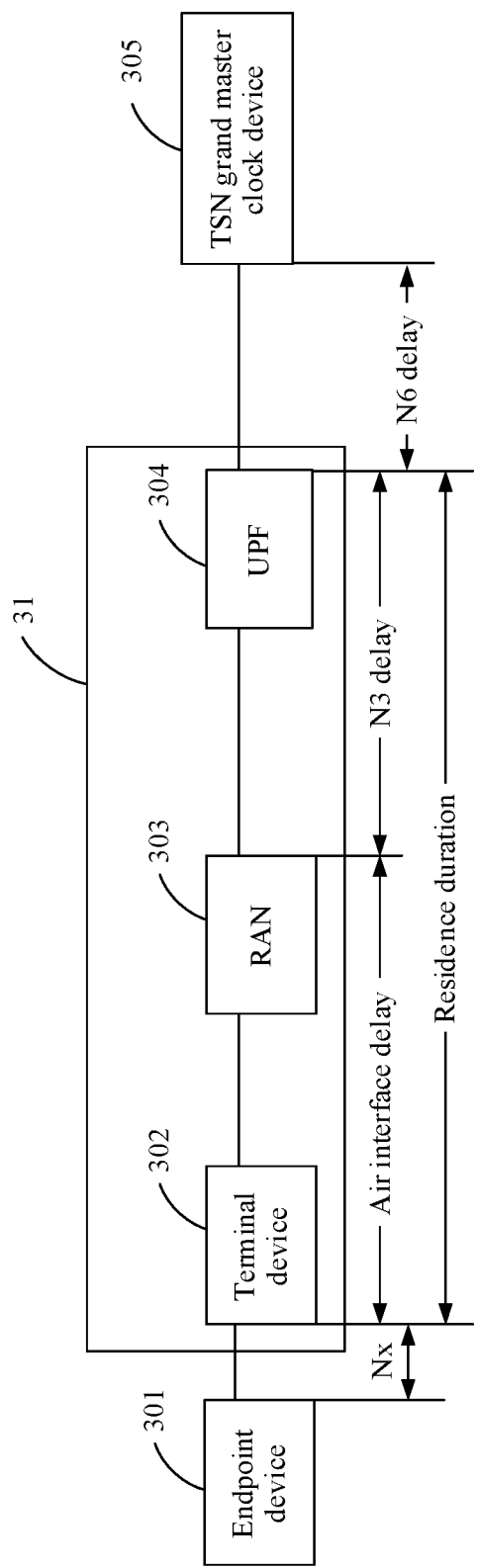
FIG. 3 is a schematic diagram of a scenario to which an embodiment of this application is applied.

FIG. 3 is a schematic diagram of a scenario to which an embodiment of this application is applied. As shown in FIG. 3, a relay network 31 may include a terminal device 302, a RAN 303, and a UPF 304. Specifically, in this case, the terminal device 302, the RAN 303, and the UPF 304 that are in a mobile network may be used as a whole, namely, the relay network 31, which may also be referred to as a "time-aware relay 31". In other words, the terminal device 302, the RAN 303, and the UPF 304 are used as a whole and are used as a bridge or a router. In this case, by using the terminal device 302, the RAN 303, and the UPF 304, synchronization between the terminal device 302 and a TSN grand master clock device 305 can be implemented, or synchronization between an endpoint device 301 connected to the terminal device 302 and a TSN grand master clock device 305 can be implemented.

Figure 4:
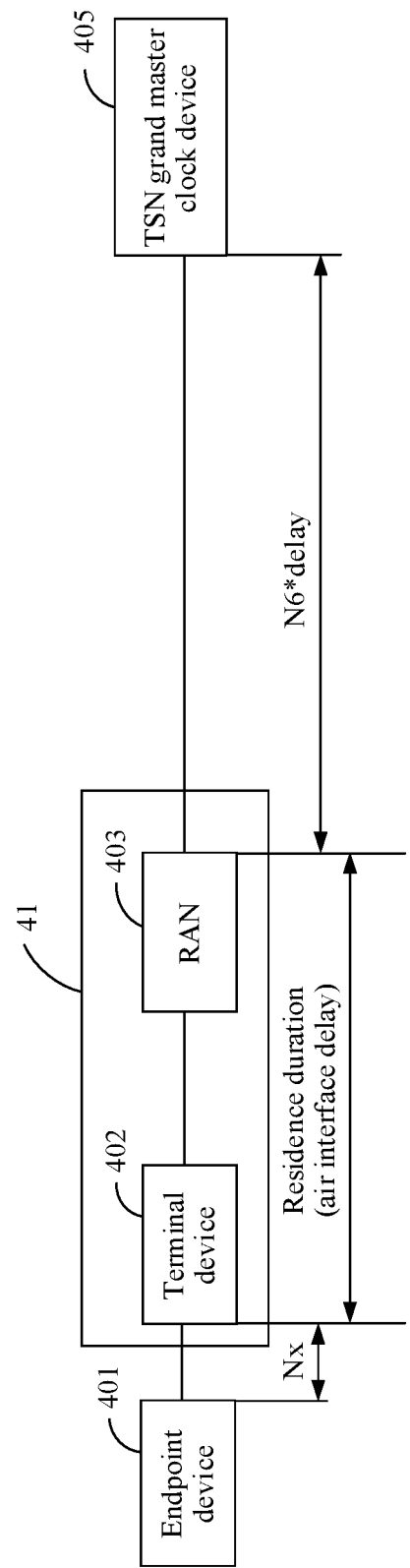
FIG. 4 is a schematic diagram of another scenario to which an embodiment of this application is applied.

FIG. 4 is a schematic diagram of another scenario to which an embodiment of this application is applied. As shown in FIG. 4, a relay network 41 includes a terminal device 402 and a RAN 403. Specifically, in this case, the terminal device 402 and the RAN 403 that are in a mobile network may be used as a whole, namely, the relay network 41, which may also be referred to as a "time-aware relay (time-aware relay) 41". In other words, the terminal device 402 and the RAN 403 are used as a whole and are used as a bridge (bridge) or a router (router). In this case, by using the terminal device 402 and the RAN 403, synchronization between the terminal device 402 and a TSN grand master clock device 405 can be implemented, or synchronization between an endpoint device 401 connected to the terminal device 402 and a TSN grand master clock device 405 can be implemented.

It should be noted that the TSN grand master clock device 305 shown in FIG. 3 or the TSN grand master clock device 405 shown in FIG. 4 may alternatively be a device node that has performed clock synchronization with a grand master clock device. In the present disclosure, the grand master clock device is used as an example for description, but this is not limited.

Optionally, the endpoint device may be integrated with the terminal device in the relay network. This is not limited in this embodiment of this application.

Figure 5:
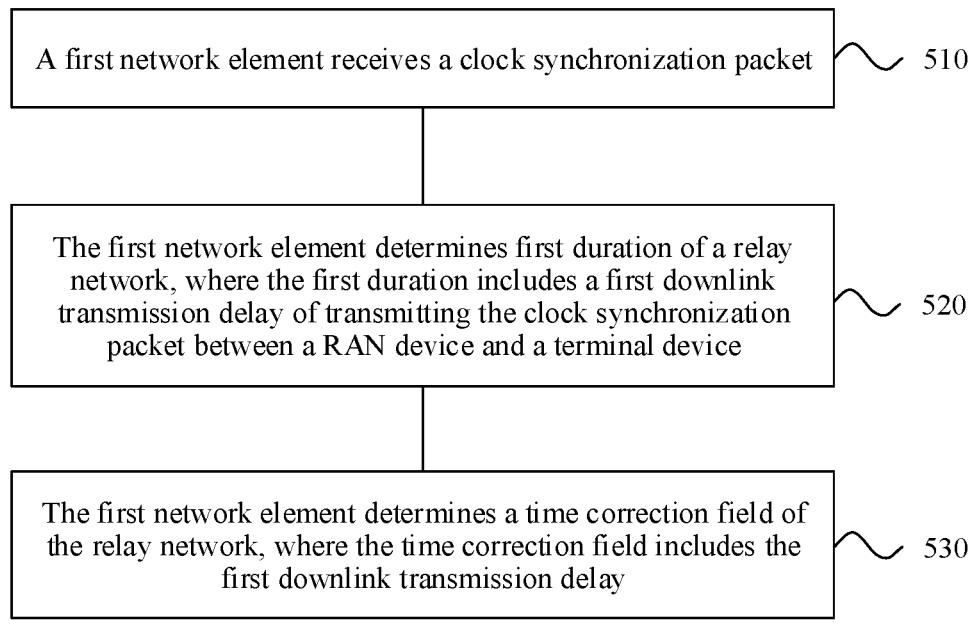
FIG. 5 is a schematic flowchart of a synchronization method according to an embodiment of this application.

FIG. 5 is a schematic flowchart of a synchronization method according to an embodiment of this application. The method is performed by a first network element in a relay network. Specifically, when the relay network includes a UPF, a RAN, and a terminal device, the first network element may be the UPF, the RAN, or the terminal device. When the relay network includes a RAN and a terminal device, the first network element may be the RAN or the terminal device.

The synchronization method shown in FIG. 5 includes steps 510 to 530.

510: The first network element receives a clock synchronization packet.

520: The first network element determines first duration of the relay network, where the first duration of the relay network includes a corresponding first downlink transmission delay of transmitting the clock synchronization packet between the RAN and the terminal device.

530: The first network element determines a time correction field of the relay network, where the time correction field includes the first downlink transmission delay.

Therefore, in this embodiment of this application, the first network element may determine the time correction field of the relay network based on the clock synchronization packet. The time correction field includes the corresponding first downlink transmission delay of transmitting the clock synchronization packet between the RAN device and the terminal device. This helps implement clock synchronization between the terminal device or an endpoint device and an external clock by using a TSN clock synchronization mechanism in a mobile network.

This embodiment of this application uses an example in which the clock synchronization packet is a SYNC packet for description. The first duration may also be referred to as residence duration, and indicates a processing delay from receiving a SYNC packet by an ingress port of the relay network to sending a SYNC packet by an egress port. In this embodiment of this application, because the relay network includes at least the RAN and the terminal device, the first duration includes at least the first downlink transmission delay of transmitting the clock synchronization packet between the RAN device and the terminal device.

With reference to the scenario shown in FIG. 3, the following describes in detail the synchronization method in this embodiment of this application.

Specifically, in FIG. 3, a link between the terminal device 302 and the endpoint device 301 and a link between the UPF 304 and the TSN grand master clock device 305 are TSN links. On the TSN links, a parameter may be transferred by using the time synchronization principle of the 802.1AS. These links are not described in detail in this embodiment of this application.

In the scenario shown in FIG. 3, an ingress port of the time-aware relay 31 is an ingress port of the UPF 304, and an egress port of the time-aware relay 31 is an egress port of the terminal device 302. When the egress port of the time-aware relay 31 sends a SYNC packet to the endpoint device 301, the SYNC packet needs to carry a correction field CF. The correction field CF includes corresponding residence duration of processing the SYNC packet by the time-aware relay 31 and a transmission delay between the time-aware relay 31 and a node that sends the SYNC packet.

As shown in FIG. 3, CF=Residence duration+N6 delay (delay_N6_link). The N6 delay is a downlink transmission delay between the node device (namely, the TSN grand master clock device 305) that sends the clock synchronization packet and the relay network 31 (namely, the ingress port of the UPF 304), and may be referred to as a second downlink transmission delay in this embodiment of this application.

In this embodiment of this application, it is assumed that time synchronization is not performed between the terminal device and the UPF in the time-aware relay 31. The residence duration includes an air interface delay (delay_Uu_DL) between the RAN and the terminal device and an N3 delay (delay_N3_link). Specifically, delay_Uu_DL may be a corresponding first downlink transmission delay of transmitting the SYNC packet between the RAN and the terminal device. delay_N3_link may be specifically a downlink transmission delay between the UPF and the RAN, and may be referred to as a third downlink transmission delay in this embodiment of this application.

In this embodiment of this application, the UPF 304, the RAN 303, or the terminal device 302 in the relay network 31 may separately perform time field correction, that is, determine the correction field CF. A link Link that needs to be modified on the egress port of the relay network 31, namely, the egress port of the terminal device 302, is as follows:

Link=relay_link+N6_link=Uu_link+N3_link+N6_link.

The relay_link represents links corresponding to the relay network 31, that is, includes a Uu link (Uu_link) between the egress port of the terminal device 302 and an ingress port of the RAN 303 and an N3 link (N3_link) between the ingress port of the UPF 304 and the ingress port of the RAN 303. The N6_link represents a link between an egress port of the TSN grand master clock device 305 and the ingress port of the UPF 304.

Herein, it may be assumed that a frequency ratio of local time of the UPF 304 to local time (namely, air interface time) of the RAN 303 is a ratio 1, and a frequency ratio of the TSN grand master clock to the local time of the UPF 304 is a ratio 2.

The following separately describes specific solutions in which the UPF 304, the RAN 303, or the terminal device 302 performs time field correction.

1. The UPF Performs Time Field Correction.

Figure 6:
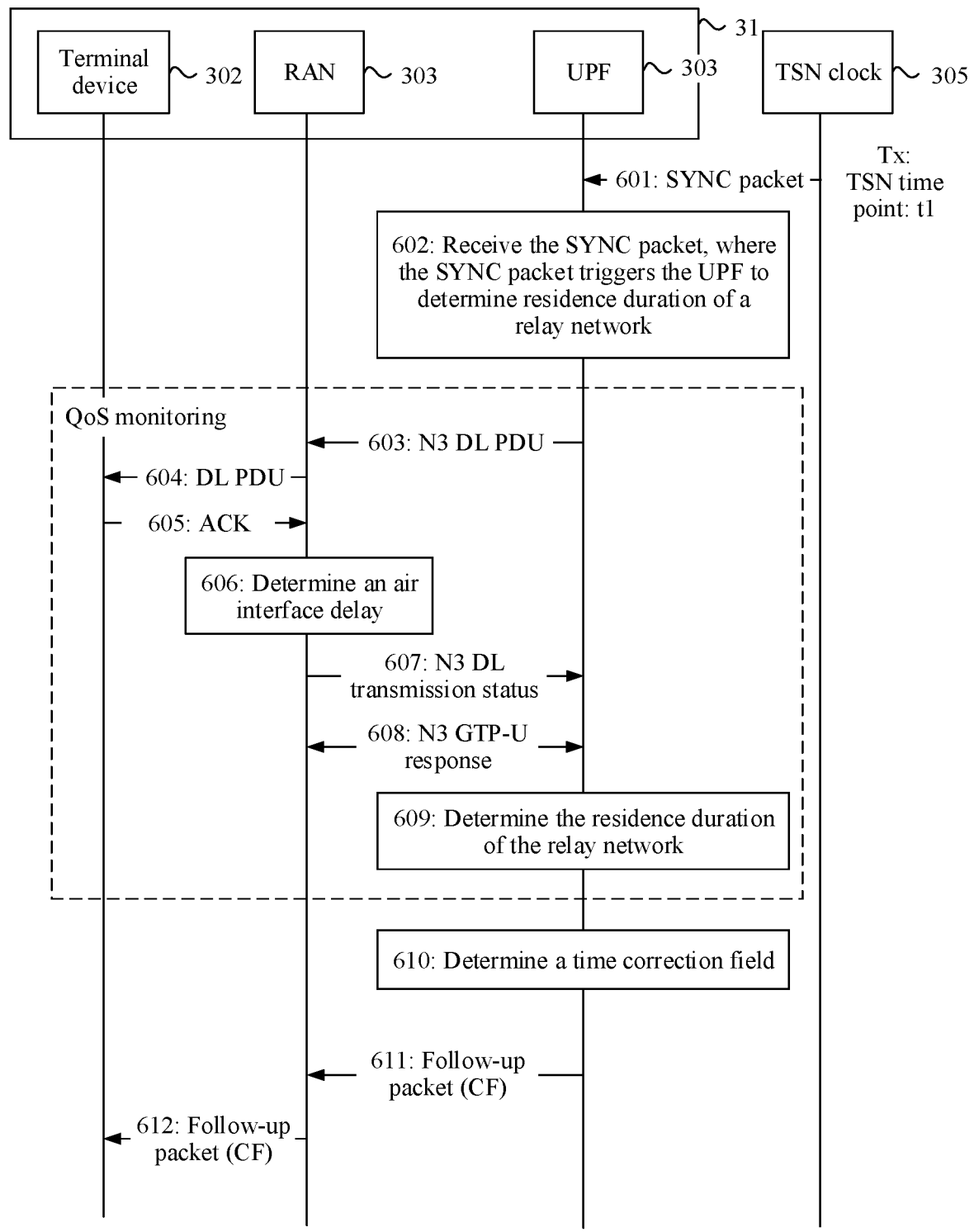
FIG. 6 is a schematic flowchart of an example of a specific synchronization method according to an embodiment of this application.

FIG. 6 shows an example of a specific synchronization method according to an embodiment of this application. It should be understood that FIG. 6 shows steps or operations of the synchronization method, but the steps or operations are merely examples. In this embodiment of this application, other operations or variations of the operations in FIG. 6 may further be performed. In addition, the steps in FIG. 6 may be performed in a sequence different from that presented in FIG. 6, and possibly, not all the operations in FIG. 6 need to be performed. In FIG. 6, a reference numeral the same as a reference numeral in FIG. 3 indicates a same or similar meaning. For brevity, details are not described herein again.

- 601: A TSN clock sends a SYNC packet to an ingress port of a relay network 31, namely, an ingress port of a UPF. For example, a time point at which the TSN clock sends the SYNC packet is t1.

In an optional embodiment, the TSN clock may determine an N6 delay (delay_N6_link), and send delay_N6_link to the relay network 31. In a possible implementation, when a one-step mechanism is used, the SYNC packet carries t1, a ratio 2, and delay_N6_link. Alternatively, in another possible implementation, when a two-step mechanism is used, t1, a ratio 2, and delay_N6_link are carried in a follow_up packet immediately after the SYNC packet.

In an optional embodiment, delay_N6_link may be measured by the relay network 31 (for example, the UPF network element in the relay network 31). Specifically, for a process in which the UPF measures delay_N6_link, refer to description in a conventional technology. Details are not described herein.

In this embodiment of this application, the TSN clock may be replaced with another clock device, for example, GrandMaster. This is not specifically limited in this embodiment of this application.

- 602: The ingress port of the relay network 31, namely, the ingress port of the UPF receives the SYNC packet sent by the TSN clock, where the SYNC packet triggers the UPF to determine residence duration of the relay network.

In this embodiment of this application, the SYNC packet may be used to trigger the UPF to determine the residence duration of the relay network. Specifically, after identifying that a received packet is the SYNC packet, the UPF may be triggered to determine the residence duration of the relay network. Specifically, the UPF may identify, based on policy information configured on the UPF or based on policy information received from an SMF, whether the received packet is the SYNC packet.

It should be noted that the policy information refers to a policy of identifying the SYNC packet. The policy information is, for example, information such as a source address or a destination address. For example, when determining that a source address or a destination address of the received packet is consistent with the policy information, the UPF may determine that the packet is the SYNC packet. It should be noted that, in this embodiment of this application, the policy information may also be referred to as another name, for example, a forwarding rule or session management information. This is not limited in this embodiment of this application.

For example, the policy information may be a destination MAC address 01-80-C2-00-00-0E. When the UPF determines that a destination MAC address of the received packet is 01-80-C2-00-00-0E, a RAN determines that the packet is the SYNC packet.

In this embodiment of this application, after the UPF identifies the SYNC packet, downlink QoS monitoring between the UPF and UE may be triggered, to determine the residence duration of the relay network.

The QoS monitoring may specifically include steps 603 to 609.

- 603: The UPF sends an N3 DL PDU to the RAN.

Specifically, the UPF sends the SYNC packet to the RAN through an N3 user plane path. The SYNC packet is the SYNC packet received from the TSN clock in step 602. Herein, the UPF needs to encapsulate a GTP-U header in the SYNC packet. A packet obtained after the GTP-U header is encapsulated is the N3 DL PDU.

In this embodiment of this application, the UPF may further send first indication information to the RAN. The first indication information indicates the RAN device to obtain a downlink air interface delay, namely, a first downlink transmission delay. In other words, the first indication information indicates the RAN to trigger measurement of the downlink air interface delay. In a possible implementation, the first indication information may be sent to the RAN together with the SYNC packet. For example, the first indication information is carried in the GTP-U header. This is not limited in this embodiment of this application.

Optionally, in this embodiment of this application, the first indication information includes a first quality of service (QoS) flow identifier (QoS flow ID, QFI). In this case, the first indication information indicates the RAN device to obtain, when receiving a packet corresponding to the first QFI, the first downlink transmission delay.

Herein, the first QFI is a special QFI. To be specific, a QoS flow packet corresponding to the first QFI is a clock synchronization packet, for example, the SYNC packet. In other words, when the packet received by the RAN includes the first QFI, the RAN may identify the packet as the SYNC packet, and then may be triggered to measure the first downlink transmission delay.

Correspondingly, the RAN receives the N3 DL PDU from the UPF. After receiving the N3 DL PDU sent by the UPF, the RAN triggers, based on the first indication information, the measurement of the downlink air interface delay. In this case, the RAN records a corresponding air interface time point air_t1 of receiving the SYNC packet.

- 604: The RAN sends a DL PDU to a terminal device through an air interface, where the DL PDU includes the SYNC packet.
- 605: After receiving the SYNC packet, the terminal device returns an acknowledgment (ACK) to the RAN. The ACK carries a corresponding air interface time point air_t2 of receiving the SYNC packet by the terminal device.

It should be noted that, in this embodiment of this application, that a network element receives the SYNC packet includes that the network element processes the SYNC packet, for example, processes the SYNC packet by using protocol layers in the network element. Correspondingly, a corresponding air interface time point of receiving the SYNC packet by the network element is a time point after the network element processes the SYNC packet. Herein, the network element is, for example, a terminal device, a RAN, or a UPF. Therefore, an egress port of the terminal device 302 described in this application may also be understood as an ingress port of the terminal device 302, and a corresponding air interface time point of receiving the SYNC packet by the ingress port of the terminal device 302 may be understood as a time point after the terminal device 302 processes the SYNC packet.

606: When receiving the ACK returned by the terminal device, the RAN determines that downlink transmission succeeds. In this case, the RAN determines the downlink air interface delay delay_Uu_DL.

delay_Uu_DL=air_t2−air_t1, where a time unit of the delay_Uu_DL is an air interface time unit.

607: The RAN sends an N3 packet to the UPF. The N3 packet includes the downlink air interface delay delay_Uu_DL.

Correspondingly, the UPF receives the N3 packet, and obtains the downlink air interface delay delay_Uu_DL.

608: The UPF obtains an N3 delay.

In a possible implementation, the UPF may measure the N3 delay (delay_N3_link) by using a GTP-U echo request and a GTP-U echo response.

Specifically, the UPF sends the GTP-U echo request to the RAN at a time point Ta, and the RAN receives the GTP-U echo request at a time point Tb. The RAN sends the GTP-U echo response to the UPF at a time point Tc, and the UPF receives the GTP-U echo response at a time point Td.

In this case, delay_N3_link=[(Td−Ta)−(Tc−Tb)]/2.

When there is a frequency offset between the RAN and the UPF, assuming that a frequency ratio of a local clock of the UPF to a local clock of the RAN is a ratio 1, delay_N3_link=[(Td−Ta)−(Tc−Tb)×ratio 1]/2. In this case, a time unit of delay_N3_link is a local time unit of the UPF.

609: The UPF determines the residence duration (delay_relay) of the relay network, which may also be referred to as a downlink transmission delay of the relay network. delay_relay is as follows:

delay_relay=delay_*Uu_DL*+delay_*N3_link*.

When there is a frequency offset between the RAN and the UPF, assuming that the frequency ratio of the local clock of the UPF to the local clock of the RAN is the ratio 1, that a time unit of delay_relay is converted into the local time unit of the UPF is as follows:

delay_relay=delay_*Uu_DL*×ratio 1+delay_*N3_link*.

Further, assuming that a frequency ratio of the TSN clock to the local clock of the UPF is a ratio 2, that the time unit of delay_relay is converted into a TSN time unit is as follows:

delay_relay=(delay_*Uu_DL*×ratio 1+delay_*N3_link*)× ratio 2.

610: The UPF determines a time correction field CF.

Specifically, the UPF determines the time correction field CF based on the residence duration (delay_relay) of the relay network and a transmission delay, namely, the N6 delay (delay_N6_link), between the UPF and the TSN clock. A time unit of the time correction field CF is the TSN time unit. The CF is as follows:

CF=delay_relay+delay_*N6_link*.

611: The UPF sends the time correction field CF to the RAN.

612: The RAN sends the time correction field CF to the terminal device.

Specifically, in step 611, the UPF may include the time correction field in a follow_up packet and send the follow_up packet to the RAN. It may be understood that the follow_up packet is a follow_up packet immediately after the SYNC packet in step 603. Then, in step 612, the RAN forwards the follow_up packet to the terminal device through the air interface.

It should be noted that, in step 611, the UPF may alternatively send the CF to the RAN by using another packet. This is not limited in this embodiment of this application.

Then, the terminal device may perform clock synchronization with the TSN clock based on the received CF. Further, the terminal device may perform clock synchronization with an endpoint device. Specifically, for a synchronization process between the terminal device and the endpoint device, refer to the 802.1AS mechanism. Details are not described herein again.

Therefore, in this embodiment of this application, the terminal device, the RAN, and the UPF are used as the relay network, and the UPF in the relay network determines an "internal delay" of transmitting the SYNC packet in the relay network, namely, duration from receiving the SYNC packet by the UPF to receiving the SYNC packet by the terminal device, so that time synchronization between the terminal device (or a TSN endpoint device connected to the terminal device) and a TSN clock source is implemented.

2. The RAN Performs Time Field Correction.

Figure 7:
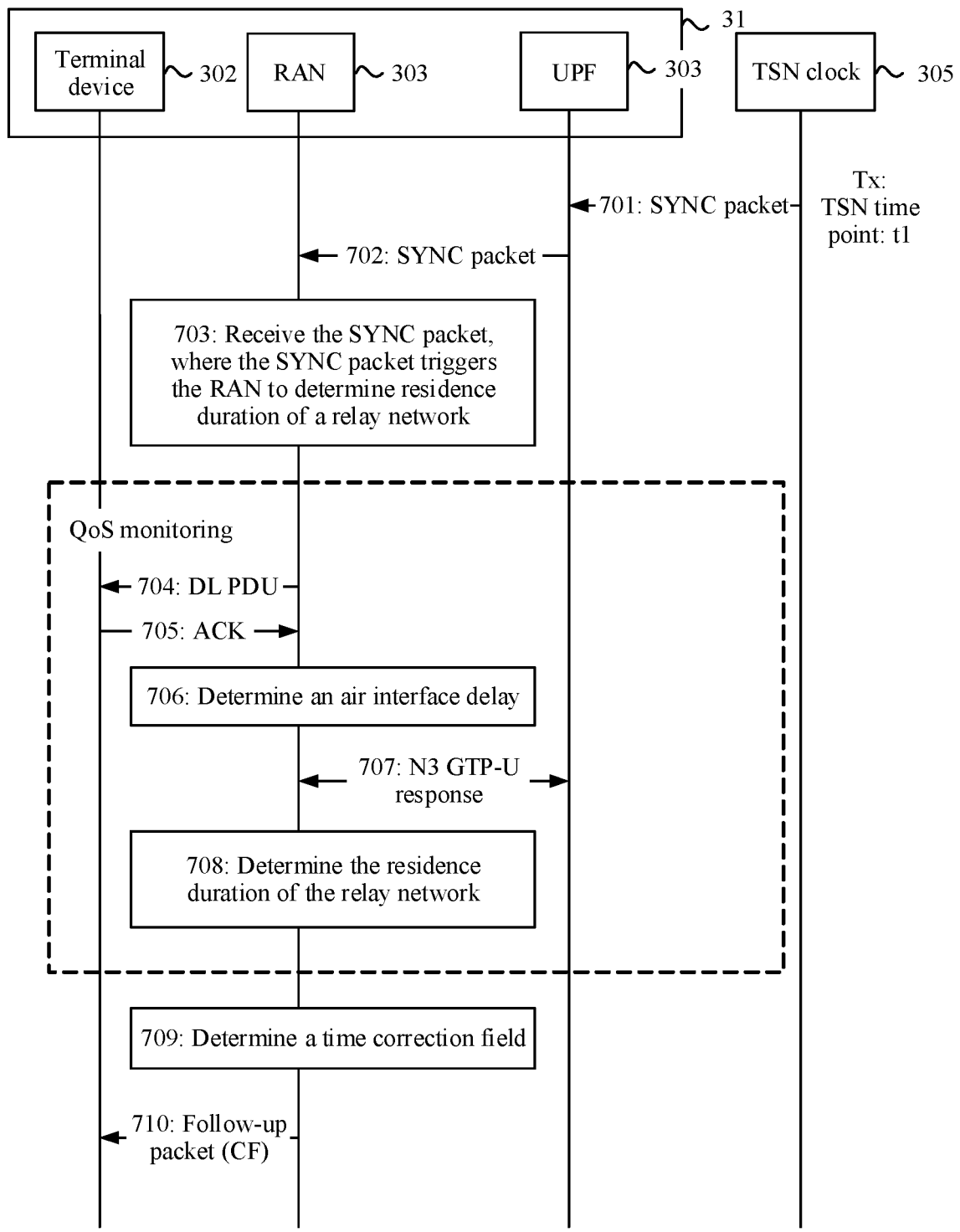
FIG. 7 is a schematic flowchart of an example of a specific synchronization method according to an embodiment of this application.

FIG. 7 shows an example of a specific synchronization method according to an embodiment of this application. It should be understood that FIG. 7 shows steps or operations of the synchronization method, but the steps or operations are merely examples. In this embodiment of this application, other operations or variations of the operations in FIG. 7 may further be performed. In addition, the steps in FIG. 7 may be performed in a sequence different from that presented in FIG. 7, and possibly, not all the operations in FIG. 7 need to be performed. In FIG. 7, a reference numeral the same as a reference numeral in FIG. 3 indicates a same or similar meaning. For brevity, details are not described herein again.

701: A TSN clock sends a SYNC packet to an ingress port of a relay network 31, namely, an ingress port of a UPF.

Specifically, for step 701, refer to the description in step 601. To avoid repetition, details are not described herein again.

702: The ingress port of the UPF receives the SYNC packet sent by the TSN clock, and an egress port of the UPF sends the SYNC packet to an ingress port of a RAN.

In an optional embodiment, when measuring delay_N6_link, the UPF sends delay_N6_link to the RAN.

703: The ingress port of the RAN receives the SYNC packet, where the SYNC packet triggers the RAN to determine residence duration of the relay network.

In this embodiment of this application, the SYNC packet may be used to trigger the RAN to determine the residence duration of the relay network. Specifically, after identifying that a received packet is the SYNC packet, the RAN may be triggered to determine the residence duration of the relay network.

In an optional embodiment, the RAN may identify, based on policy information configured on the RAN or based on policy information received from an SMF, whether the received packet is the SYNC packet. After it is identified that the packet is the SYNC packet, a first downlink transmission delay and a third downlink transmission delay may be obtained. Specifically, for the policy information, refer to the foregoing description. For brevity, details are not described herein again.

For example, the policy information may be a destination MAC address 01-80-C2-00-00-0E. When the RAN determines that a destination MAC address of the received packet is 01-80-C2-00-00-0E, the RAN determines that the packet is the SYNC packet.

In an optional embodiment, the RAN may receive second indication information. The second indication information indicates the RAN to obtain the residence duration of the relay network. Then the RAN obtains the first downlink transmission delay and the third downlink transmission delay based on the second indication information.

In a possible implementation, the second indication information may be sent to the RAN together with the SYNC packet. For example, the second indication information is carried in a GTP-U header. This is not limited in this embodiment of this application.

Optionally, in this embodiment of this application, the second indication information includes a second QFI. In this case, the second indication information indicates the RAN device to obtain, when receiving a packet corresponding to the second QFI, the residence duration of the relay network.

In a specific implementation, a QoS flow packet corresponding to the second QFI is a clock synchronization packet, namely, the SYNC packet. In other words, when the packet received by the RAN includes the second QFI, the RAN may identify the packet as the SYNC packet, and then may be triggered to obtain the residence duration of the relay network.

In this embodiment of this application, after identifying the SYNC packet, the RAN may be triggered to determine a downlink transmission delay between the UPF and a terminal device. Specifically, steps 704 to 708 may be included.

In this case, the RAN records a corresponding air interface time point air_t1 of receiving the SYNC packet.

704: The RAN sends a DL PDU to the terminal device.

Specifically, the RAN sends the DL PDU to the terminal device through an air interface, where the DL PDU includes the SYNC packet.

705: After receiving the SYNC packet, the terminal returns an acknowledgment (ACK) to the RAN. The ACK carries a corresponding air interface time point air_t2 of receiving the SYNC packet by the terminal device.

706: When receiving the ACK returned by the terminal device, the RAN determines that downlink transmission succeeds. In this case, the RAN determines a downlink air interface delay delay_Uu_DL.

delay_Uu_DL=air_t2−air_t1, where a time unit of delay_Uu_DL is an air interface time unit.

707: The RAN obtains an N3 delay.

In a possible implementation, the RAN may measure the N3 delay (delay_N3_link) by using a GTP-U echo request and a GTP-U echo response.

Specifically, the RAN sends the GTP-U echo request to the RAN at a time point Ta, and the UPF receives the GTP-U echo request at a time point Tb. The UPF sends the GTP-U echo response to the UPF at a time point Tc, and the RAN receives the GTP-U echo response at a time point Td.

In this case, delay_N3_link=[(Td−Ta)−(Tc−Tb)]/2.

When there is a frequency offset between the RAN and the UPF, assuming that a frequency ratio of a local clock of the UPF to a local clock of the RAN is a ratio 1, delay_N3_link=[(Td−Ta)−(Tc−Tb)×ratio 1]/2. In this case, a time unit of delay_N3_link is a local time unit of the UPF.

708: The RAN determines the residence duration (delay_relay) of the relay network. Specifically, delay_relay is as follows:

delay_relay=delay_Uu_DL×ratio 1+delay_N3_link,
where a time unit of delay_relay is the local
time unit of the UPF.

709: The RAN determines a time correction field CF. The CF is as follows:

CF=delay_relay×ratio 2+delay_N6_link.

It is assumed that a frequency ratio of the TSN clock to the local clock of the UPF is a ratio 2. A time unit of the CF is a TSN time unit.

Specifically, a manner in which the RAN determines the time correction field is similar to the manner in which the UPF determines the time correction field. For details, refer to the description in step 610. Details are not described herein again.

710: The RAN sends the time correction field CF to the terminal device.

Specifically, in step 710, the RAN may include the time correction field in a follow_up packet, and send the follow_up packet to the UE through the air interface. It may be understood that the follow_up packet is a follow_up packet immediately after the SYNC packet in step 704. It should be noted that, in step 710, the RAN may alternatively send the CF to the UE by using another packet. This is not limited in this embodiment of this application.

Then, the terminal device may perform clock synchronization with the TSN clock based on the received CF. Further, the terminal device may perform clock synchronization with an endpoint device. Specifically, for a synchronization process between the terminal device and the endpoint device, refer to the 802.1AS mechanism. Details are not described herein again.

Therefore, in this embodiment of this application, the terminal device, the RAN, and the UPF are used as the relay network, and the RAN in the relay network determines an "internal delay" of transmitting the SYNC packet in the relay network, namely, duration from receiving the SYNC packet by the UPF to receiving the SYNC packet by the terminal device, so that time synchronization between the terminal device (or a TSN endpoint device connected to the terminal device) and a TSN clock source is implemented.

3. The Terminal Device Performs Time Field Correction.

Figure 8:
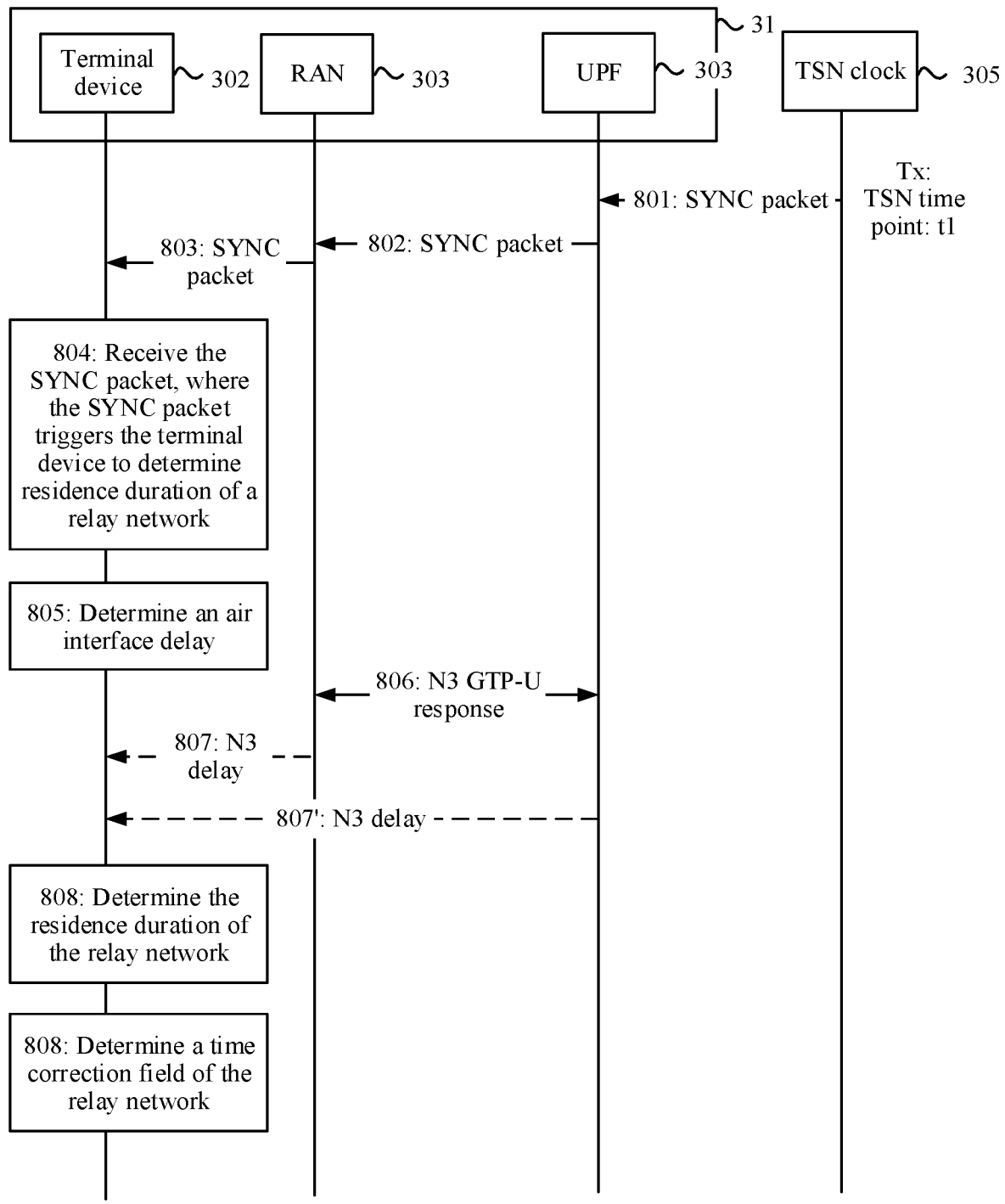
FIG. 8 is a schematic flowchart of an example of a specific synchronization method according to an embodiment of this application.

FIG. 8 shows an example of a specific synchronization method according to an embodiment of this application. It should be understood that FIG. 8 shows steps or operations of the synchronization method, but the steps or operations are merely examples. In this embodiment of this application, other operations or variations of the operations in FIG. 8 may further be performed. In addition, the steps in FIG. 8 may be performed in a sequence different from that presented in FIG. 8, and possibly, not all the operations in FIG. 8 need to be performed. In FIG. 8, a reference numeral the same as a reference numeral in FIG. 3 indicates a same or similar meaning. For brevity, details are not described herein again.

- 801: A TSN clock sends a SYNC packet to an ingress port of a relay network 31, namely, an ingress port of a UPF.

Specifically, for step 801, refer to the description in step 601. To avoid repetition, details are not described herein again.

- 802: The ingress port of the UPF receives the SYNC packet sent by the TSN clock, and an egress port of the UPF sends the SYNC packet to an ingress port of a RAN.

In an optional embodiment, when measuring delay_N6_link, the UPF sends delay_N6_link to the RAN.

- 803: The ingress port of the RAN receives the SYNC packet sent by the TSN clock, and an egress port of the RAN sends the SYNC packet to an ingress port of a terminal device. In this case, the RAN records a corresponding air interface time point air_t1 of receiving the SYNC packet, and sends the air interface time point air_t1 to the terminal device.

Herein, the RAN may further send a ratio 1 to the terminal device.

- 804: The terminal device receives the SYNC packet, where the SYNC packet triggers the terminal device to determine residence duration of the relay network. In this case, the terminal device records a corresponding air interface time point air_t2 of receiving the SYNC packet.

In this embodiment of this application, the SYNC packet may be used to trigger the terminal device to determine the residence duration of the relay network. Specifically, after identifying that a received packet is the SYNC packet, the terminal device may be triggered to determine the residence duration of the relay network. Specifically, the terminal device may identify, based on policy information configured on the terminal device or based on policy information received from an SMF, whether the received packet is the SYNC packet. Specifically, for the policy information, refer to the foregoing description. For brevity, details are not described herein again.

For example, the policy information may be a destination MAC address 01-80-C2-00-00-0E. When the terminal device determines that a destination MAC address of the received packet is 01-80-C2-00-00-0E, the RAN determines that the packet is the SYNC packet.

In an optional embodiment, the terminal device may receive third indication information. The third indication information indicates the terminal device to obtain the residence duration of the relay network.

Optionally, in this embodiment of this application, the third indication information includes a third QFI. In this case, the third indication information indicates the terminal device to obtain, when receiving a packet corresponding to the third QFI, the residence duration of the relay network.

In a specific implementation, in a session establishment process, the terminal device stores a correspondence between a radio bearer and a QFI. When determining, based on the correspondence between the radio bearer and the QFI, that the received packet corresponds to the third QFI, the terminal device may identify the packet as the SYNC packet, and is triggered to obtain the residence duration of the relay network.

In an optional embodiment, the terminal device receives the packet by using the radio bearer (namely, an air interface connection), and may determine, based on the correspondence between the radio bearer and the QFI, a QFI corresponding to the packet. When the QFI is the third QFI, the terminal device may identify the packet as the SYNC packet.

- 805: The terminal device determines an air interface delay delay_Uu_DL by using the following formula:

$$delay\_Uu\_DL = air\_t2 - air\_t1$$

A time unit of the air interface delay delay_Uu_DL is an air interface time unit.

Optionally, that the terminal device converts delay_Uu_DL into local time of the UPF is:

$$delay\_Uu\_DL = (air\_t2 - air\_t1) \times ratio\ 1.$$

- 806: The UPF or the RAN determines an N3_link delay (delay_N3_link) by using a mechanism of a GTP-U echo request and a GTP-U echo response. It should be noted that a measurement occasion of determining the N3_link delay is not limited in this embodiment of this application. In other words, step 806 may be performed before or after step 805, or simultaneously performed with step 805, which all fall within the protection scope of this embodiment of this application.

The following uses an example, in which the UPF determines delay_N3_link, for description.

(1) The UPF sends the GTP-U echo request message at a time point N3_t1.
(2) The RAN receives the GTP-U echo request at a time point N3_t2, and sends the GTP-U echo response at a time point N3_t3. Herein, the GTP-U echo response carries the N3_t2 and the N3_t3, or carries (N3_t3−N3_t2), namely, a difference between the N3_t3 and the N3_t2.
(3) The UPF receives the GTP-U echo response at a time point N3_t4.
(4) The UPF calculates delay_N3_link.

The N3_t1 and the N3_t4 correspond to local time of the UPF, and the N3_t2 and the N3_t3 correspond to local time of the RAN.

That Delay_N3_Link is converted into the local time of the UPF is as follows:

$$Delay\_N3\_Link = [(N3\_t4 - N3\_t1) - (N3\_t3 - N3\_t2) \times ratio\ 1]/2.$$

- 807: The RAN sends the N3 delay to the terminal device.

When the RAN determines the N3 delay, the RAN sends the N3 delay to the terminal device. Specifically, the RAN may send the N3 delay to the terminal device by using a follow_up message or the foregoing SYNC message. When the N3 delay is sent to the terminal device by using the SYNC message, step 807 may be combined with step 803.

- 807': The UPF sends the N3 delay to the terminal device by using the RAN.

When the UPF determines the N3 delay, the UPF sends the N3 delay to the terminal device. Specifically, the UPF may send the N3 delay to the terminal device by using a follow_up message or the foregoing SYNC message. When the N3 delay is sent to the terminal device by using the SYNC message, step 807' may be combined with step 802.

- 808: The terminal device determines the residence duration (delay_relay) of the relay network. Specifically, delay_relay is as follows:

$$delay\_relay = delay\_Uu\_DL \times ratio\ 1 + delay\_N3\_link,$$
where a time unit of the delay_relay is the local time of the UPF.

809: The terminal device determines a correction field CF. The CF is as follows:

CF=delay_relay×ratio 2+delay_*N6*_link.

A time unit of the CF is a TSN time unit.

Then, the terminal device may perform clock synchronization with the TSN clock based on the CF. Further, the terminal device may perform clock synchronization with an endpoint device. Specifically, for a synchronization process between the terminal device and the endpoint device, refer to the 802.1AS mechanism. Details are not described herein again.

Therefore, in this embodiment of this application, the terminal device, the RAN, and the UPF are used as the relay network, and the terminal device in the relay network determines an "internal delay" of transmitting the SYNC packet in the relay network, namely, duration from receiving the SYNC packet by the UPF to receiving the SYNC packet by the terminal device, so that time synchronization between the terminal device (or a TSN endpoint device connected to the terminal device) and a TSN clock source is implemented.

It should be noted that, in the embodiments of this application, when the correction field is determined, segment delay determining and time unit conversion are related. Both the segment delay determining and the time unit conversion are performed by a same execution point. For example, the UPF obtains each segment delay and performs unit conversion, or the RAN obtains each segment delay and performs unit conversion, or the UE obtains each segment delay and performs unit conversion. However, there is another implementation, that is, the segment delay determining and the time unit conversion are performed by different execution points. For example, the RAN converts air interface time into the local time of the UPF, and sends a converted air interface delay to the UPF. The UPF receives the converted air interface delay. These specific implementations are consistent with a disclosure idea of the embodiments of this application, and details are not described one by one again.

With reference to the scenario shown in FIG. 4, the following describes in detail the synchronization method in this embodiment of this application.

Specifically, in FIG. 4, a link between the terminal device 402 and the endpoint device 401 and a link between the RAN 403 and the TSN grand master clock device 405 are TSN links. On the TSN link, a parameter may be transferred by using the time synchronization principle of the 802.1AS. This part of the link is not described in detail in this embodiment of this application.

In the scenario shown in FIG. 4, an ingress port of the time-aware relay 41 is an ingress port of the RAN 403, and an egress port of the time-aware relay 41 is an egress port of the terminal device 402. When the egress port of the time-aware relay 41 sends a SYNC packet to the endpoint device 401, a time correction field CF needs to be adjusted.

As shown in FIG. 4, CF=Residence duration+N6*delay (delay_N6*_link). The N6*delay is a downlink transmission delay between the node device (namely, the TSN grand master clock device 305) that sends the clock synchronization packet and the relay network (namely, the ingress port of the RAN 403), and may be referred to as a second downlink transmission delay in this embodiment of this application.

In this embodiment of this application, the residence duration is an air interface delay (delay_Uu_DL) between the RAN device and the terminal device. Specifically, delay_Uu_DL may be specifically a first downlink transmission delay of transmitting a SYNC packet between the RAN device and the terminal device.

In this embodiment of this application, the RAN 403 or the terminal device 402 in the relay network 41 may perform time field correction. In this case, a link Link that needs to be modified on the egress port of the relay network 41, namely, the egress port of the terminal device 402, is as follows:

Link=relay_link+*N6*_link=*Uu*_link+*N6*_link.

The relay_link represents a link in the relay network 41, that is, includes a Uu link (Uu_link) between the egress port of the terminal device 402 and the ingress port of the RAN 403. The N6*_link represents a link between an egress port of the TSN grand master clock device 405 and the ingress port of the RAN 403.

Herein, it may be assumed that a frequency ratio of the TSN grand master clock to local time of the RAN 403 is a ratio.

The following separately describes specific solutions in which the RAN 403 or the terminal device 402 performs time field correction.

1. The RAN Performs Time Field Correction.

Figure 9:
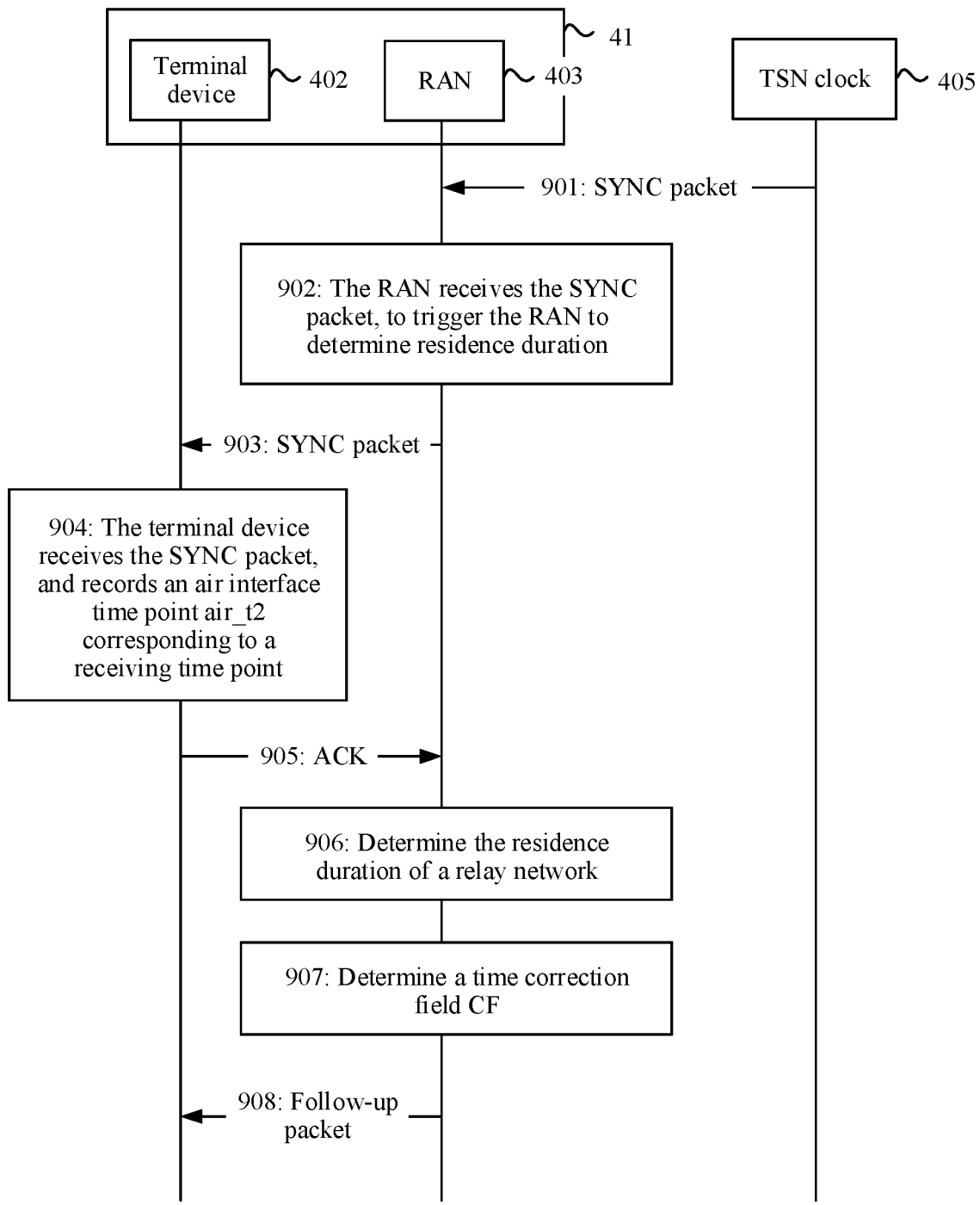
FIG. 9 is a schematic flowchart of an example of a specific synchronization method according to an embodiment of this application.

FIG. 9 shows an example of a specific synchronization method according to an embodiment of this application. It should be understood that FIG. 9 shows steps or operations of the synchronization method, but the steps or operations are merely examples. In this embodiment of this application, other operations or variations of the operations in FIG. 9 may further be performed. In addition, the steps in FIG. 9 may be performed in a sequence different from that presented in FIG. 9, and possibly, not all the operations in FIG. 9 need to be performed. In FIG. 9, a reference numeral the same as a reference numeral in FIG. 4 indicates a same or similar meaning. For brevity, details are not described herein again.

901: A TSN clock sends a SYNC packet to an ingress port of a relay network 41, namely, an ingress port of a RAN. For example, a time point at which the TSN clock sends the SYNC packet is t1.

In an optional embodiment, the TSN clock may determine an N6 delay (delay_N6*_link), and send delay_N6*_link to the relay network 41. In a possible implementation, when a one-step mechanism is used, the SYNC packet carries t1, a ratio, and delay_N6*_link. Alternatively, in another possible implementation, when a two-step mechanism is used, t1, a ratio, and delay_N6*_link are carried in a follow_up packet immediately after the SYNC packet.

In an optional embodiment, delay_N6*_link may be measured by the relay network 41 (for example, the RAN in the relay network 41). Specifically, for a process in which the RAN measures delay_N6*_link, refer to description in a conventional technology. Details are not described herein.

902: The ingress port of the RAN receives the SYNC packet sent by the TSN clock, where the SYNC packet triggers the RAN to determine residence duration of the relay network. In this case, the RAN records a corresponding air interface time point air_t1 of receiving the SYNC packet.

In this embodiment of this application, the SYNC packet may be used to trigger the RAN to determine the residence duration of the relay network. Specifically, after identifying that a received packet is the SYNC packet, the RAN may be triggered to determine the residence duration of the relay network.

In an optional embodiment, the RAN may identify, based on policy information configured on the RAN or based on policy information received from an SMF, whether the received packet is the SYNC packet. After it is identified that the packet is the SYNC packet, a first downlink transmission delay and a third downlink transmission delay may be obtained. Specifically, for the policy information, refer to the foregoing description. For brevity, details are not described herein again.

For example, the policy information may be a destination MAC address 01-80-C2-00-00-0E. When the RAN determines that a destination MAC address of the received packet is 01-80-C2-00-00-0E, the RAN determines that the packet is the SYNC packet.

In an optional embodiment, the RAN may alternatively measure delay_N6*_link.

903: The RAN sends the SYNC packet to the terminal device.

Specifically, the RAN sends the SYNC packet to the terminal device through an air interface. An SDAP header and a PDCP header are encapsulated at an outer layer of the SYNC packet.

904: After receiving the SYNC packet, the terminal returns an acknowledgment (ACK) to the RAN. The ACK carries a corresponding air interface time point air_t2 of receiving the SYNC packet by the terminal device.

905: When receiving the ACK returned by the terminal device, the RAN determines that downlink transmission succeeds. In this case, the RAN determines a downlink air interface delay delay_Uu_DL.

delay_Uu_DL=air_t2−air_t1, where a time unit of delay_Uu_DL is an air interface time unit.

That the RAN converts delay_Uu_DL into a TSN time unit as follows:

delay_$Uu\_DL$=(air_$t2$−air_$t1$)×ratio.

906: The RAN determines the residence duration (delay_relay) of the relay network. Specifically, delay_relay is as follows:

delay_relay=delay_Uu_DL, that is, the residence duration delay_relay of the relay network is equal to the downlink air interface delay delay_Uu_DL.

907: The RAN determines a time correction field CF. The CF is as follows:

CF=delay_relay+delay_$N6*\_link$=(air_$t2$−air_$t1$)× ratio+delay_$N6*\_link$, where a time unit of the CF is the TSN time unit.

908: The RAN sends the time correction field CF to the terminal device.

Specifically, in step 908, the RAN may include the time correction field in a follow_up packet, and send the follow_up packet to the terminal device through the air interface. It may be understood that the follow_up packet is a follow_up packet immediately after the SYNC packet in step 903.

Then, the terminal device may perform clock synchronization with the TSN clock based on the received CF. Further, the terminal device may perform clock synchronization with an endpoint device. Specifically, for a synchronization process between the terminal device and the endpoint device, refer to the 802.1AS mechanism. Details are not described herein again. It should be noted that, in step 908, the RAN may alternatively send the CF to the terminal device by using another packet. This is not limited in the present disclosure.

Therefore, in this embodiment of this application, the terminal device and the RAN are used as the relay network, and the RAN in the relay network determines an "internal delay" of transmitting the SYNC packet in the relay network, namely, duration from receiving the SYNC packet by the RAN to receiving the SYNC packet by the terminal device, so that time synchronization between the terminal device (or a TSN endpoint device connected to the terminal device) and a TSN clock source is implemented.

2. The Terminal Device Performs Time Field Correction.

Figure 10:
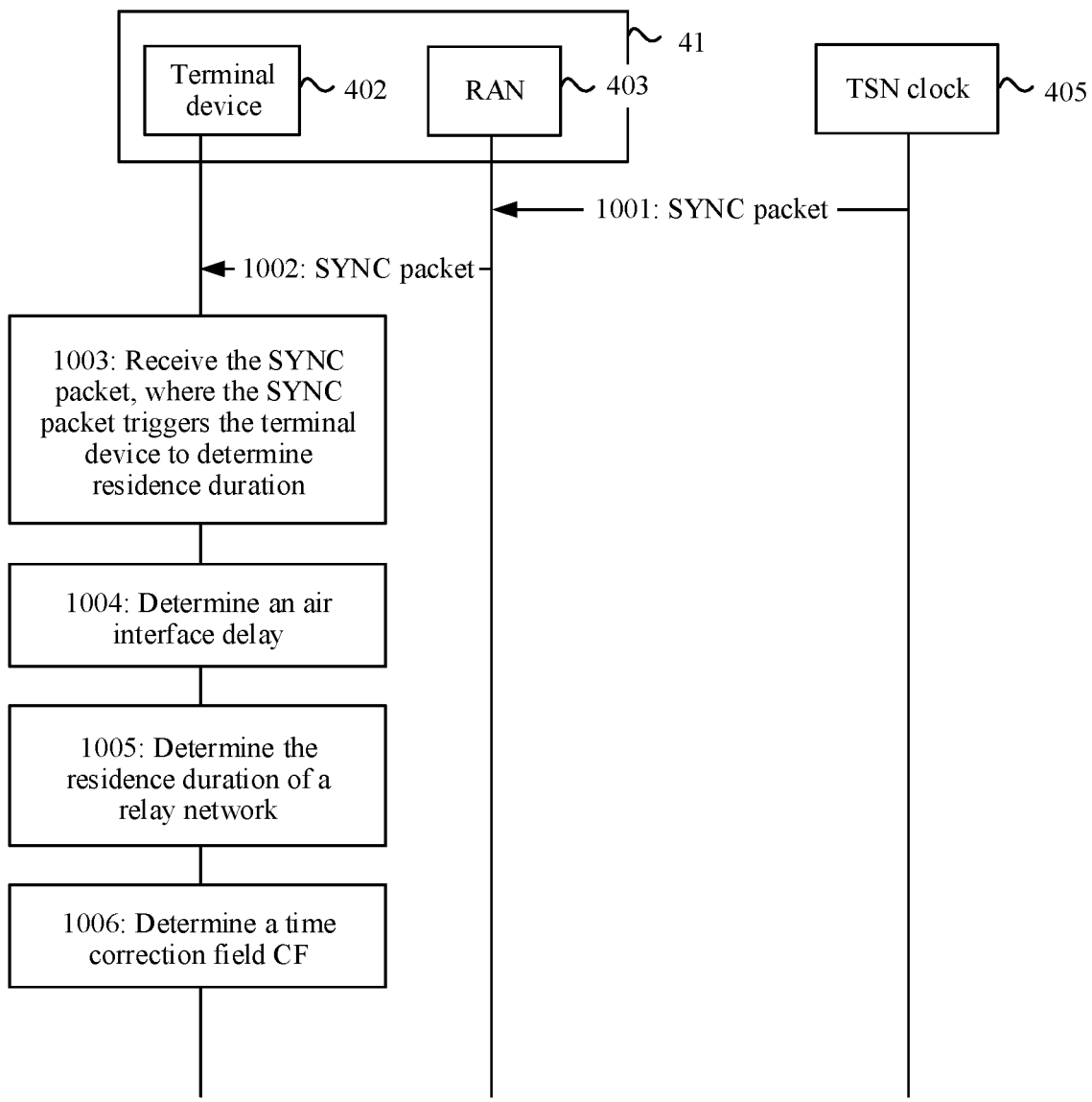
FIG. 10 is a schematic flowchart of an example of a specific synchronization method according to an embodiment of this application.

FIG. 10 shows an example of a specific synchronization method according to an embodiment of this application. It should be understood that FIG. 10 shows steps or operations of the synchronization method, but the steps or operations are merely examples. In this embodiment of this application, other operations or variations of the operations in FIG. 10 may further be performed. In addition, the steps in FIG. 10 may be performed in a sequence different from that presented in FIG. 10, and possibly, not all the operations in FIG. 10 need to be performed. In FIG. 10, a reference numeral the same as a reference numeral in FIG. 4 indicates a same or similar meaning. For brevity, details are not described herein again.

1001: A TSN clock sends a SYNC packet to an ingress port of a relay network 41, namely, an ingress port of a RAN.

Specifically, for step 1001, refer to the description in step 901. To avoid repetition, details are not described herein again.

1002: The ingress port of the RAN receives the SYNC packet sent by the TSN clock, and an egress port of the RAN sends the SYNC packet to an ingress port of a terminal device. Specifically, the RAN sends the SYNC packet to the terminal device through an air interface. An SDAP header and a PDCP header are encapsulated at an outer layer of the SYNC packet.

In an optional embodiment, when the RAN measures delay_N6*_link, the RAN sends delay_N6*_link to the terminal device.

In this case, the RAN records a corresponding air interface time point air_t1 of receiving the SYNC packet, and sends the air interface time point air_t1 to the terminal device.

Optionally, the RAN may further send a ratio to the terminal device.

1003: The terminal device receives the SYNC packet, where the SYNC packet triggers the terminal device to determine residence duration of the relay network. In this case, the terminal device records a corresponding air interface time point air_t2 of receiving the SYNC packet.

In this embodiment of this application, the SYNC packet may be used to trigger the terminal device to determine the residence duration of the relay network. Specifically, for a manner in which the terminal device identifies the SYNC packet, refer to the description in step 804 in FIG. 8. For brevity, details are not described herein again.

1004: The terminal device determines an air interface delay delay_Uu_DL by using the following formula:

delay_$Uu\_DL$=air_$t2$−air_$t1$.

A time unit of the air interface delay delay_Uu_DL is an air interface time unit.

The terminal device converts a time unit of delay_Uu_DL into a TSN time unit by using the following formula:

delay_$Uu\_DL$=(air_$t2$−air_$t1$)×ratio.

1005: The terminal device determines the residence duration (delay_relay) of the relay network. Specifically, delay_relay is as follows:

delay_relay=delay_Uu_DL, that is, the residence duration delay_relay of the relay network is equal to the downlink air interface delay delay_Uu_DL.

1006: The terminal device determines a correction field CF. The CF is as follows:

CF=delay_relay+delay_N6*_link=(air_t2−air_t1)× ratio+delay_N6*_link, where a time unit of the CF is the TSN time unit.

Then, the terminal device may perform clock synchronization with the TSN clock based on the CF. Further, the terminal device may perform clock synchronization with an endpoint device. Specifically, for a synchronization process between the terminal device and the endpoint device, refer to the 802.1AS mechanism. Details are not described herein again.

Therefore, in this embodiment of this application, the terminal device and the RAN are used as the relay network, and the terminal device in the relay network determines the "internal delay" of transmitting the SYNC packet in the relay network, namely, duration from receiving the SYNC packet by the RAN to receiving the SYNC packet by the terminal device, so that time synchronization between the terminal device (or a TSN endpoint device connected to the terminal device) and a TSN clock source is implemented.

In a possible embodiment, in the mobile network shown in FIG. 1, an end to end (E2E) clock synchronization mechanism may be used to implement network-wide synchronization.

Specifically, E2E clock synchronization includes time synchronization and frequency synchronization. Time synchronization means that internal time of a device is adjusted based on a receiving time point. Frequency synchronization means that a strict and specific relationship is maintained between frequencies or phases of signals, and valid moments corresponding to the signals appear at a same rate, to ensure that all devices in a communications network operate at a same rate, that is, a phase difference between the signals is constant.

In a specific implementation, timestamps may be added to a message to mark time points of receiving and sending the message, and a delay measurement mechanism is used to implement path delay measurement between a master device and a slave device. A slave clock calculates an offset between master time and slave time by using an obtained timestamp and a path delay parameter. In this way, the slave clock is controlled to be synchronized with a master clock.

According to the 1588 clock synchronization packet protocol, when network-wide synchronization is implemented by using the E2E clock synchronization mechanism, involved messages may include a SYNC packet, a delay request (delay_req), and a delay response (delay_resp). Specifically, a tree topology for network-wide clock synchronization and a grandmaster clock are obtained by using a grand master clock selection and negotiation algorithm. Then the grand master clock sends a 1588 synchronization packet to a neighboring node (slave), where the sending starts from the grandmaster clock. After performing clock synchronization with reference to the master, each slave exchanges, as a master, a 1588 protocol packet with a neighbor, to calculate an offset between the grand master clock and the slave clock and a frequency offset, thereby completing local clock synchronization. By analogy, network-wide clock synchronization is performed.

Figure 11:
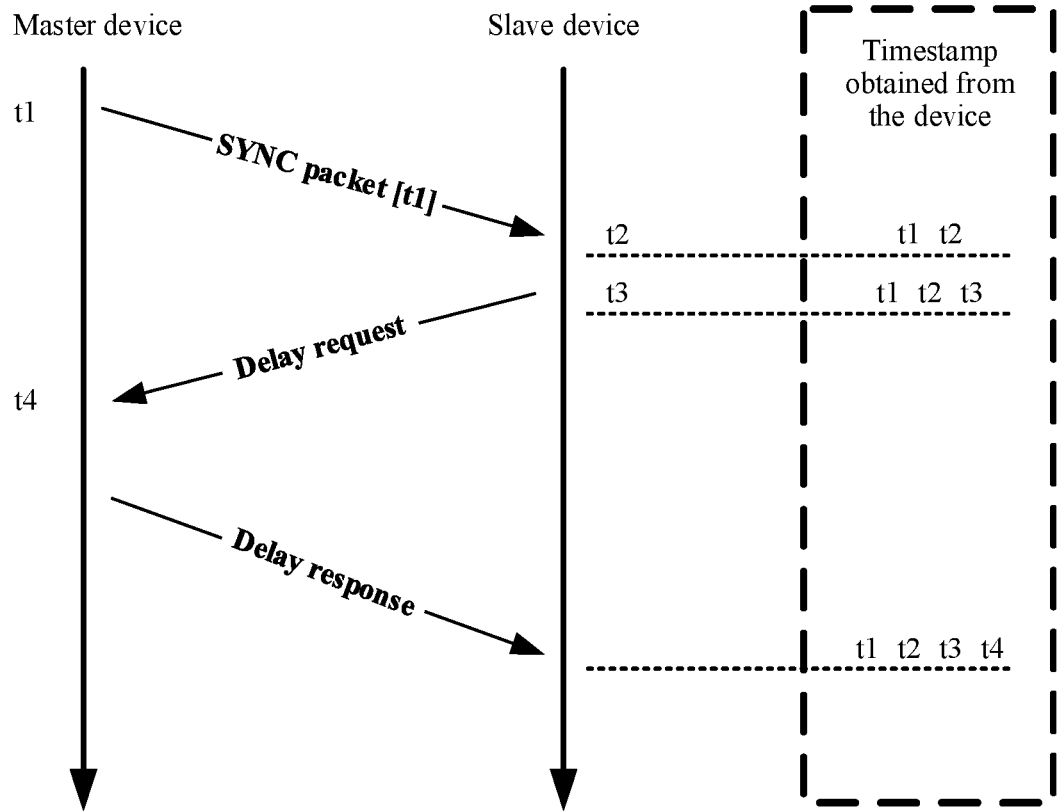
FIG. 11 is a conceptual diagram of another time synchronization method.

FIG. 11 is a conceptual diagram of another time synchronization method in the 802.1AS. Specifically, an interaction process between a master and a slave is as follows:

1. The master sends a SYNC packet at a time point t1, and includes a timestamp t1 in the SYNC packet.
2. The slave receives the SYNC packet at a time point t2, and locally generates a timestamp t2. In addition, the slave obtains the timestamp t1 from the received SYNC packet.
3. The slave sends a delay request (delay_req) packet at a time point t3, and locally generates a timestamp t3.
4. The master receives the delay_req packet at a time point t4, locally generates a timestamp t4, includes the timestamp t4 in a delay response (delay_resp) packet, and sends the delay response to the slave.
5. The slave receives the delay_resp packet, and extracts the timestamp t4 from the packet.

In this embodiment of this application, a delay of a sending path from the master to the slave may be represented as delayms, a delay of a sending path from the slave to the master may be represented as delaysm, and a time offset between the slave and the master may be represented as offset. Obviously, delayms, delaysm, and offset are all unknown, and satisfy the following equations:

$$t2-t1=\text{delaysm}+\text{offset} \quad (1);$$

$$t4-t3=\text{delayms}-\text{offset} \quad (2);$$

$$(t2-t1)-(t4-t3)=(\text{delaysm}+\text{offset})-(\text{delayms}-\text{offset}) \quad (3); \text{ and}$$

$$\text{offset}=[(t2-t1)-(t4-t3)-(\text{delaysm}-\text{delayms})]/2 \quad (4).$$

It is clear that, if delaysm=delayms, that is, the delays of the sending link and the receiving link between the master and the slave are symmetrical, the following equation is satisfied:

$$\text{offset}=[(t2-t1)-(t4-t3)]/2 \quad (5).$$

In this way, the slave may calculate the time offset offset between the slave and the master based on the timestamp t1, the timestamp t2, the timestamp t3, and the timestamp t4, and adjust time of the slave to be synchronized with time of the master.

It can be seen from FIG. 11 that, the clock synchronization method is based on the symmetrical delays of the sending link and the receiving link between the master and the slave, that is, when a path offset offset is calculated by using the 802.1AS protocol, it is assumed that delaysm=delayms. In a fixed network, two adjacent nodes are directly connected through a wire, and a path delay difference does not exceed one microsecond (μs). Therefore, in this case, precision of the 1588v2 protocol may be in a μs level.

Figure 12:
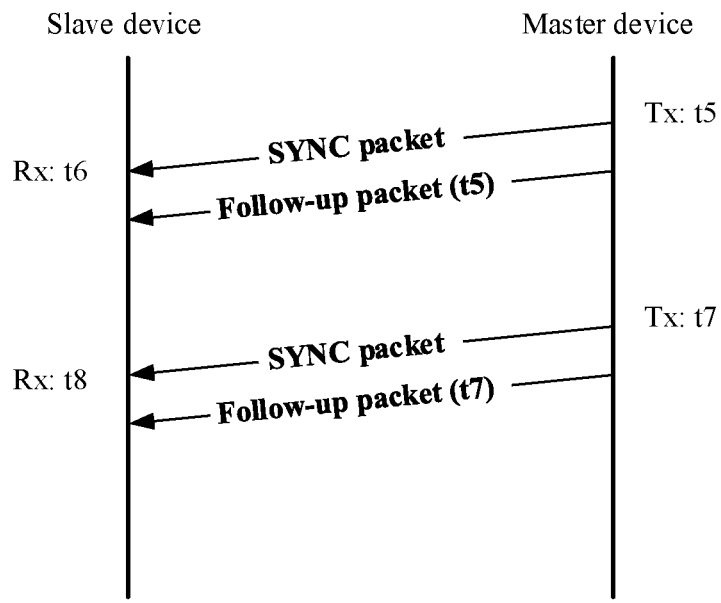
FIG. 12 is a conceptual diagram of a frequency synchronization method.

FIG. 12 is a conceptual diagram of a frequency synchronization method in the 802.1AS. Specifically, a master periodically sends a SYNC packet to a slave. Specifically, an interaction process between the master and the slave is as follows:

1. The master sends a SYNC packet at a time point t5.

In an implementation, a timestamp t5 may be carried in a follow_up packet corresponding to the SYNC packet. In another implementation, a timestamp t5 may be carried in the SYNC packet.

2. The slave receives the SYNC packet at a time point t6, and locally generates a timestamp t6. In addition, the slave obtains the timestamp t5 from the received follow_up packet or the received SYNC packet.

3. The master sends a SYNC packet at a time point t7.

In an implementation, a timestamp t7 may be carried in a follow_up packet corresponding to the SYNC packet. In another implementation, a timestamp t7 may be carried in the SYNC packet.

4. The slave receives the SYNC packet at a time point t8, and locally generates a timestamp t8. In addition, the slave obtains the timestamp t7 from the received follow_up packet or the received SYNC packet.

It is assumed that a link delay remains unchanged.

If t8−t6=t7−t5, a frequency of the slave is synchronized with a frequency of the master.

If t8−t6>t7−t5, a frequency of the slave is higher than a frequency of the master. In this case, the frequency of the slave needs to be reduced.

If t8−t6<t7−t5, a frequency of the slave is lower than a frequency of the master. In this case, the frequency of the slave needs to be increased.

Specifically, a ratio neighborRateRatio of the frequency of the master device to the frequency of the slave device may be represented by the following formula:

$$neighborRateRatio = \frac{(t7-t5)}{(t8-t6)} \qquad (6)$$

The clock synchronization solutions shown in FIG. 11 and FIG. 12 depend on symmetrical delays of a receiving link and a sending link. However, in a mobile network, an uplink and a downlink are not symmetrical. Therefore, if the TSN clock synchronization mechanism needs to be used in the mobile network, an uplink transmission delay or a downlink transmission delay needs to be compensated for. Specifically, link delays in the mobile network include an air interface delay. In the air interface delay, the delays of the receiving link and the sending link (namely, the uplink and the downlink) are not symmetrical. This does not satisfy a requirement of the E2E time synchronization mechanism.

In view of this, an embodiment of this application provides a clock synchronization method. Asymmetric delays on an air interface link are compensated for, to simulate an air interface delay in which an uplink and a downlink are symmetrical, and further perform clock synchronization based on the clock synchronization principles in FIG. 11 and FIG. 12. The following specifically describes a technical solution of how to compensate for an uplink delay or a downlink delay.

Figure 13:
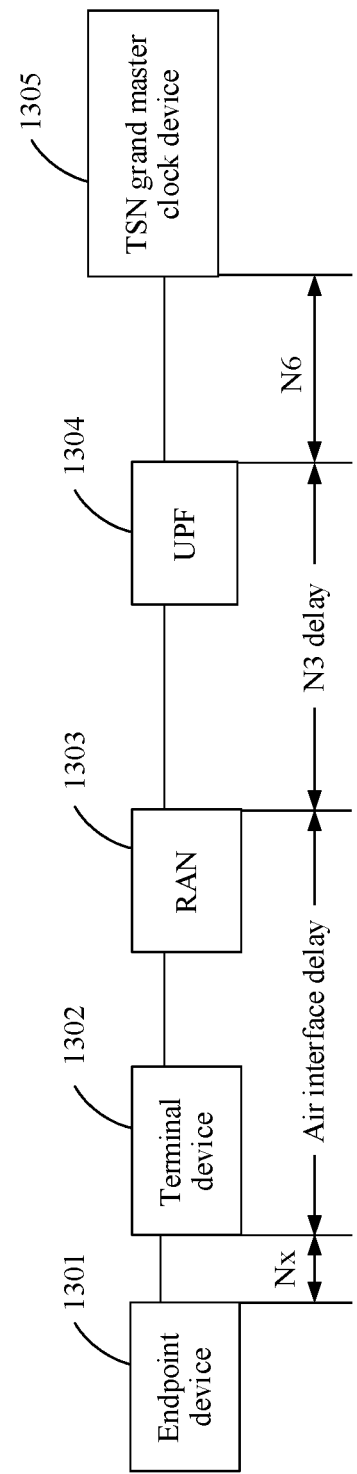
FIG. 13 is a schematic diagram of a scenario to which an embodiment of this application is applied.

FIG. 13 is a schematic diagram of a scenario to which an embodiment of this application is applied. As shown in FIG. 13, a terminal device may perform clock synchronization with a TSN clock source by using the E2E mechanism, and then perform clock synchronization with an endpoint device by using the 802.1AS. Specifically, a link delay between a UPF and the terminal device includes two segments, which are separately an air interface delay and an N3 delay. In the air interface delay, a delay of a receiving link and a delay of a sending link are asymmetric, so that the delay of the receiving link and the delay of the sending link needs to be compensated for in this embodiment of this application.

For the embodiment of time synchronization, a difference between a downlink transmission delay and an uplink transmission delay of a mobile network may be recorded as D, which is show as follows:

$$D = delaysm - delayms \qquad (7).$$

With reference to the foregoing equation (4), the following may be obtained:

$$2 \times delaysm + D = (t2-pt1) + (t4-t3);$$

$$2 \times delaysm = (t2-t1) + (t4-t3) - D;$$

$$= (t2-t1) + t4 - (t3+D),$$

$$tx = (t3+D), \text{ so that:}$$

$$2 \times delaysm = (t2-t1) + t4 - tx \qquad (8)$$

Therefore, in this embodiment of this application, the difference between the uplink transmission delay and the downlink transmission delay may be compensated to a timestamp t3, namely, the time point at which the master sends delay_resp.

In this case, the formula for the slave to calculate the time offset is changed as follows:

$$Offset = t2 - t1 - delaysm \qquad (9).$$

Specifically, in the scenario shown in FIG. 13, delaysm and delayms are as follows:

delaysm=delay (UPF to RAN)+delay (RAN to UE);

delayms=delay (UE to RAN)+delay (RAN to UPF).

An uplink and a downlink between a RAN and a UPF are symmetric links, that is:

delay (UPF to RAN)=delay (RAN to UPF).

In this case, the difference D between the downlink transmission delay and the uplink transmission delay of the air interface may be represented as follows:

D=delaysm−delayms=delay (RAN to UE)−delay (UE to RAN).

When an uplink and a downlink between a RAN and a UPF are asymmetric links, assuming that a difference between a delay (UPF to RAN) and a delay (RAN to UPF) is an empirical value delay_N3, D may be represented as follows:

D=delaysm−delayms=delay (RAN to UE)−delay (UE to RAN)+delay_N3.

For the embodiment of frequency synchronization, when a link delay in a mobile network dynamically changes, the following equations are satisfied:

$$t6-t5 = delaysm\_1 \qquad (10)$$

$$t8-t7 = delaysm\_2 \qquad (11)$$

In this embodiment of this application, X=delaysm_1−delaysm_2, and then the following may be obtained based on the foregoing two formulas (10) and (11):

$$t8-t7 = delaysm\_1 - X.$$

In other words, t8−(t7−X)=delaysm_1, that is, tx=t7−X.

A link dynamic delay difference is compensated for to a timestamp (namely, t7, a time point at which the master sends SYNC).

In this case, the formula used by the slave device to calculate frequency synchronization is changed into the following formula:

$$neighborRateRatio = \frac{(tx-t5)}{(t8-t6)}$$

Therefore, in this embodiment of this application, the link dynamic delay difference may be compensated for to the timestamp t7, namely, the time point at which the master sends the SYNC packet.

Specifically, in the scenario shown in FIG. 13, delaysm_1 and delaysm_2 are as follows:

delaysm_1=delay (UPF to RAN)_1+delay (RAN to UE)_1;

delaysm_2=delay (UPF to RAN)_2+delay (RAN to UE)_2.

When a link between the RAN and the UPF is a fixed link, a link delay is fixed, that is:

delay (UPF to RAN)_1=delay (UPF to RAN)_2.

In this case, X=delaysm_1−delaysm_2=delay (RAN to UE)_1−delay (RAN to UE)_2.

When a link between the RAN and the UPF is a non-fixed link, it is assumed that an offset between two adjacent delays between the UPF and the RAN is an empirical value delay_N3'. In this case, the following equation is satisfied:

X=delaysm_1−delaysm_2=delay (RAN to UE)_1−delay (RAN to UE)_2+delay_N3'.

Therefore, in this embodiment of this application, the uplink delay or the downlink delay on the air interface delay is compensated for, so that the uplink delay and the downlink delay that are obtained after the compensation are symmetric. In this way, the terminal device can be synchronized with the TSN clock by using the E2E mechanism, and then be synchronized with the endpoint device by using the 802.1AS, thereby implementing synchronization between the terminal device (or the TSN endpoint device connected to the terminal device) and the TSN clock source.

It should be noted that this embodiment of this application is described by using an example in which the uplink and the downlink between the RAN and the UPF are symmetrical, and/or the link is the fixed link.

Figure 14:
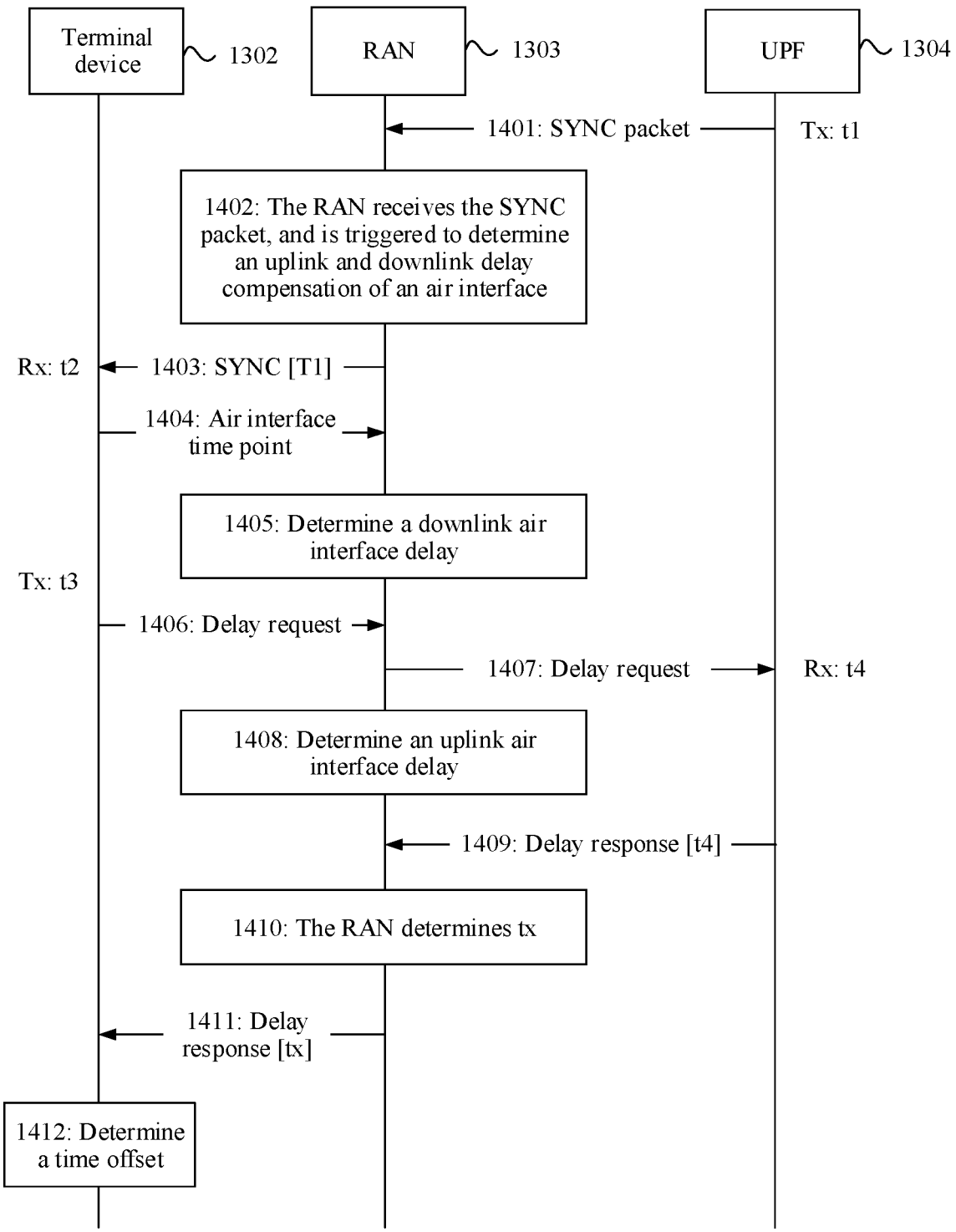
FIG. 14 is a schematic flowchart of an example of a specific synchronization method according to an embodiment of this application.

FIG. 14 shows an example of a specific synchronization method according to an embodiment of this application. It should be understood that FIG. 14 shows steps or operations of the synchronization method, but the steps or operations are merely examples. In this embodiment of this application, other operations or variations of the operations in FIG. 14 may further be performed. In addition, the steps in FIG. 14 may be performed in a sequence different from that presented in FIG. 14, and possibly, not all the operations in FIG. 14 need to be performed. In FIG. 14, a reference numeral the same as a reference numeral in FIG. 13 indicates a same or similar meaning. For brevity, details are not described herein again.

1401: A UPF sends an SYNC packet to a RAN. For example, the UPF sends the SYNC packet to the RAN at a time point t1, where a time unit of t1 is a TSN time unit.

Optionally, the SYNC packet may carry t1, an N6 delay (delay_N6_link), and a frequency ratio 1 of a TSN clock to a local clock of the UPF. Specifically, for a manner in which the UPF sends the SYNC packet to the RAN, refer to the description in step 601. For brevity, details are not described herein again.

1402: The RAN receives the SYNC packet, and is triggered to determine an uplink and downlink delay compensation D of an air interface.

Herein, the uplink and downlink delay compensation D of the air interface is a difference between a downlink delay (delay (RAN to UE)) of the air interface and an uplink delay (delay (UE to RAN)) of the air interface.

In this embodiment of this application, the SYNC packet may be used to trigger the determining of the uplink and downlink delay compensation of the air interface. Specifically, after identifying that a received packet is the SYNC packet, the RAN may be triggered to determine the uplink and downlink delay compensation of the air interface. Specifically, steps 1403 to 1411 may be included.

Specifically, for a manner in which the RAN identifies the SYNC packet, refer to the description in step 703. For brevity, details are not described herein again.

In this case, the RAN records a corresponding air interface time point air_t1 of receiving the SYNC packet.

1403: The RAN sends the SYNC packet to a terminal device through the air interface.

1404: The terminal device returns, to the RAN through the air interface, an air interface time point air_t2 of receiving the SYNC packet.

1405: The RAN determines a downlink air interface delay delay (RAN to UE).

Specifically, for steps 1403 to 1405, refer to the description in steps 704 to 706. For brevity, details are not described herein again.

1406: After receiving the SYNC packet, the terminal device sends a delay_req packet to the RAN, where a corresponding sending time point is air_t3.

Specifically, an SDAP header and a PDCP header may be encapsulated at an outer layer of the delay_req packet.

In an implementation, the air_t3 and the air_t2 may be carried in the packet sent to the RAN in step 1406. Specifically, the air_t3 and the air_t2 may be carried in the delay_Req packet, or carried in the encapsulated headers at the outer layer of the delay_Req packet. This is not limited in this embodiment of this application.

Correspondingly, the RAN receives the delay_req packet. Specifically, a time point at which the RAN receives the delay_req packet is air_t4.

1407: After receiving the delay_req packet sent by the terminal device, the RAN sends the delay_req packet to the UPF by using an N3 user plane connection.

Correspondingly, the UPF receives the delay_req packet, where a corresponding receiving time point is t4.

1408: The RAN determines a delay (UE to RAN).

Specifically, the RAN determines, based on the air_t3 and the air_t4, that the uplink air interface delay delay (UE to RAN)=air_t4−air_t3.

1409: The UPF sends a delay_resp packet to the RAN by using the N3 user plane connection, where the delay_resp packet carries the time point t4.

1410: The RAN receives the delay_Resp packet, and determines tx, where tx=t4+D.

Specifically, the RAN determines tx based on t4 in the delay_resp packet, the previously determined downlink air interface delay delay (RAN to UE), and the previously determined uplink air interface delay delay (UE to RAN). Herein, the delay (RAN to UE) may be represented as delay_Uu_DL, and the uplink air interface delay delay (UE to RAN) may be represented as delay_Uu_UL. In this case, tx is as follows:

tx=t4+(delay_Uu_DL−delay_Uu_UL).

1411: The RAN sends the delay_resp packet to the terminal device, where the delay_resp packet carries tx.

It should be noted that when a frequency ratio of the TSN time to a RAN time is a ratio, a time unit of the (delay_Uu_DL-delay_Uu_UL) needs to be first converted to the TSN time unit. In this case, tx is as follows:

$$tx=t4+(\text{delay\_}Uu\_DL-\text{delay\_}Uu\_UL)\times\text{ratio}.$$

In this embodiment of this application, both the delay_req packet and the delay_resp packet are precision time protocol (PTP) packets. In a possible implementation, when the RAN receives an uplink packet or a downlink packet, the RAN may identify whether the received packet is the PTP packet. Then, the RAN may perform a corresponding operation based on a type of the identified packet.

1412: The terminal device determines offset based on tx. Specifically, offset is as follows:

$$2\times\text{offset}=(t2-t1)-(tx-t3).$$

In another optional embodiment of this application, the UPF may modify tx. Specifically, in this case, the RAN may send the delay (RAN to UE) and the delay (UE to RAN) to the UPF. Alternatively, the RAN sends the difference (namely, delay_Uu_DL-delay_Uu_UL) between the delay (RAN to UE) and the delay (UE to RAN) to the UPF. For example, the foregoing parameters are sent to the UPF in step 1407. Then, the UPF may derive tx based on t4, the downlink air interface delay delay (RAN to UE), and the uplink air interface delay delay (UE to RAN), or derive tx based on t4 and delay_Uu_DL-delay_Uu_UL. Finally, the UPF sends delay_resp to the terminal device by using the RAN, where delay_resp carries tx.

Therefore, in this embodiment of this application, the RAN or the UPF compensates for the uplink delay or the downlink delay of the air interface link, so that the terminal device can implement time synchronization with the TSN clock by using the E2E mechanism, and then implement time synchronization with an endpoint device by using the 802.1AS, thereby implementing time synchronization between the terminal device (or the TSN endpoint device connected to the terminal device) and the TSN clock source.

Figure 15:
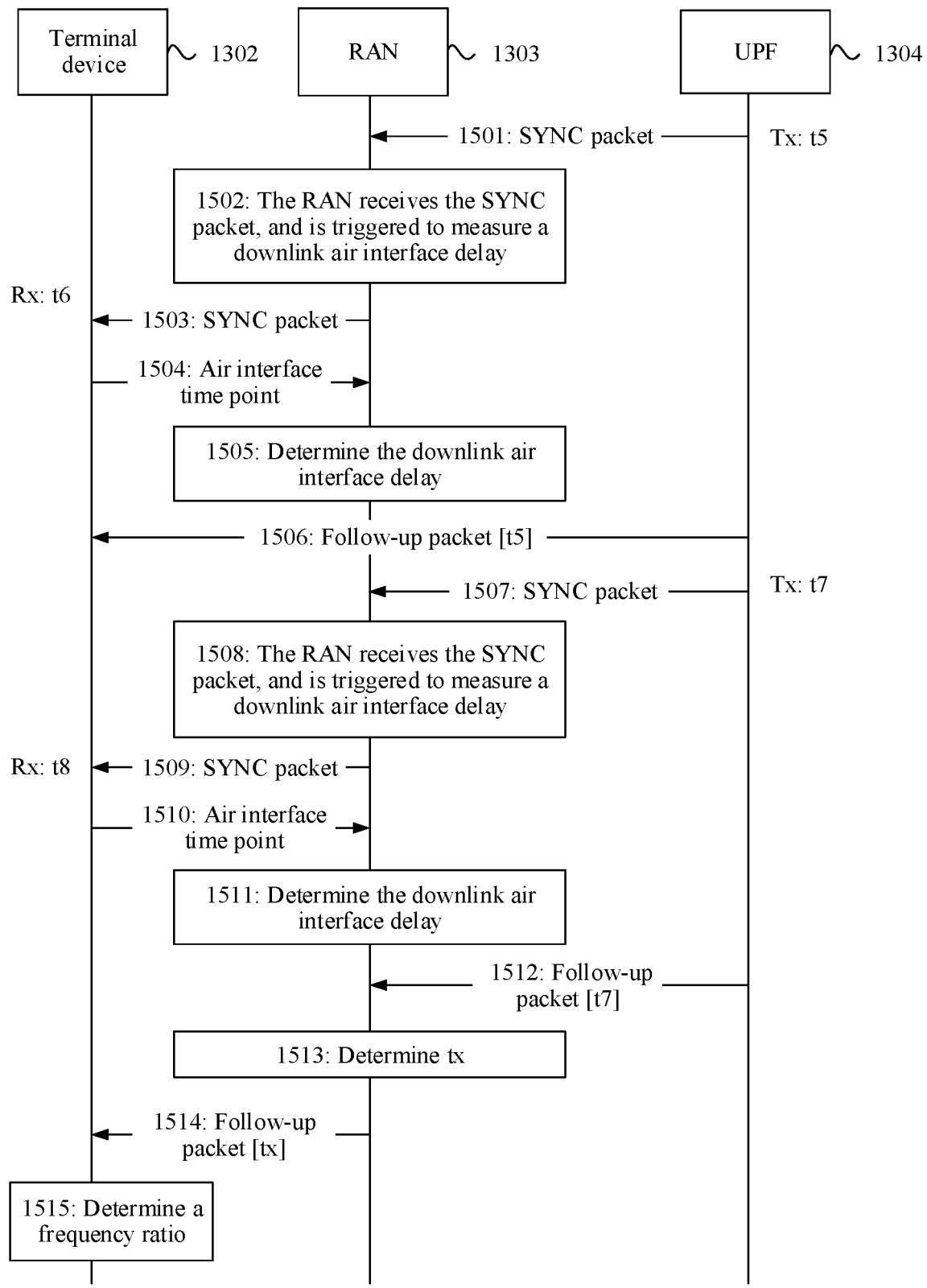
FIG. 15 is a schematic flowchart of an example of a specific synchronization method according to an embodiment of this application.

FIG. 15 shows an example of a specific synchronization method according to an embodiment of this application. It should be understood that FIG. 15 shows steps or operations of the synchronization method, but the steps or operations are merely examples. In this embodiment of this application, other operations or variations of the operations in FIG. 15 may further be performed. In addition, the steps in FIG. 15 may be performed in a sequence different from that presented in FIG. 15, and possibly, not all the operations in FIG. 15 need to be performed. In FIG. 15, a reference numeral the same as a reference numeral in FIG. 13 indicates a same or similar meaning. For brevity, details are not described herein again.

1501: A UPF sends an SYNC packet to a RAN. For example, the UPF sends the SYNC packet to the RAN at a time point t5, where a time unit of t5 is a TSN time unit.

Optionally, the SYNC packet may carry t5. When the SYNC packet does not carry t5, the UPF sends a follow_up packet to the RAN immediately after sending the SYNC packet.

1502: The RAN receives the SYNC packet, and is triggered to measure a downlink air interface delay.

In this embodiment of this application, the SYNC packet may be used to trigger determining of the measurement of the downlink air interface delay. Specifically, after identifying that a received packet is the SYNC packet, the RAN may be triggered to determine the measurement of the downlink air interface delay. Specifically, steps 1503 to 1505 may be included.

Specifically, for a manner in which the RAN identifies the SYNC packet, refer to the description in step 703. For brevity, details are not described herein again.

In this case, the RAN records a corresponding air interface time point air_t1 of receiving the SYNC packet.

1503: The RAN sends the SYNC packet to a terminal device through the air interface.

Correspondingly, the terminal device receives the SYNC packet, where a time point of receiving the SYNC packet is t6, and is local time of the terminal device.

1504: The terminal device returns, to the RAN through the air interface, an air interface time point air_t2 of receiving the SYNC packet.

1505: The RAN determines a delay (RAN to UE)_1, where the delay (RAN to UE)_1 is as follows:

$$\text{delay (RAN to UE)\_1}=\text{air\_}t2-\text{air\_}t1.$$

Specifically, for steps 1503 to 1505, refer to the description in steps 704 to 706. For brevity, details are not described herein again.

Optionally, after performing step 1501, the UPF performs step 1506, that is, sends, to the RAN, the follow_up packet corresponding to the SYNC packet in step 1501, where the follow_up packet may include the time point t5. After receiving the follow_up packet, the RAN sends the follow_up packet to the terminal device.

1507: The UPF sends an SYNC packet to the RAN. For example, the UPF sends the SYNC packet to the RAN at a time point t7, where a time unit of t7 is a TSN time unit.

Optionally, the SYNC packet may carry t7. When the SYNC packet does not carry t7, the UPF sends a follow_up packet to the RAN immediately after sending the SYNC packet.

1508: The RAN receives the SYNC packet, and is triggered to measure a downlink air interface delay.

In this case, the RAN records a corresponding air interface time point air_t3 of receiving the SYNC packet.

1509: The RAN sends the SYNC packet to a terminal device through the air interface.

Correspondingly, the terminal device receives the SYNC packet, where a time point of receiving the SYNC packet is t8, and is local time of the terminal device.

1510: The terminal device returns, to the RAN through the air interface, an air interface time point air_t4 of receiving the SYNC packet.

1511: The RAN determines a delay (RAN to UE)_2, where the delay (RAN to UE)_2 is as follows:

$$\text{delay (RAN to UE)\_2}=\text{air\_}t4-\text{air\_}t3.$$

Optionally, after performing step 1507, the UPF performs step 1512, that is, sends, to the RAN, the follow_up packet corresponding to the SYNC packet in step 1507, where the follow_up packet may include the time point t7.

Specifically, for steps 1507 to 1512, refer to the description in steps 1501 to 1506. For brevity, details are not described herein again.

1513: The RAN determines tx, where tx=t7−X. X=delay (RAN to UE)_1−delay (RAN to UE)_2.

Specifically, the RAN deduces tx based on obtained t7, recorded delay (RAN to UE)_1, and recorded delay (RAN to UE)_2. tx is as follows:

$$tx=t7-[\text{delay (RAN to UE)\_1}-\text{delay (RAN to UE)\_2}].$$

1514: The RAN sends a follow_up packet to the terminal device, where the follow_up packet carries tx.

1515: The terminal device determines a frequency ratio neighborRateRatio based on tx. Specifically, neighborRateRatio is as follows:

$$neighborRateRatio = \frac{(tx - t5)}{(t8 - t6)}.$$

Therefore, in this embodiment of this application, the RAN or the UPF compensates for the uplink delay or the downlink delay of the air interface link, so that the terminal device can implement frequency synchronization with the TSN clock by using the E2E mechanism, and then implement frequency synchronization with an endpoint device by using the 802.1AS, thereby implementing synchronization between the terminal device (or the TSN endpoint device connected to the terminal device) and the TSN clock source.

Figure 16:
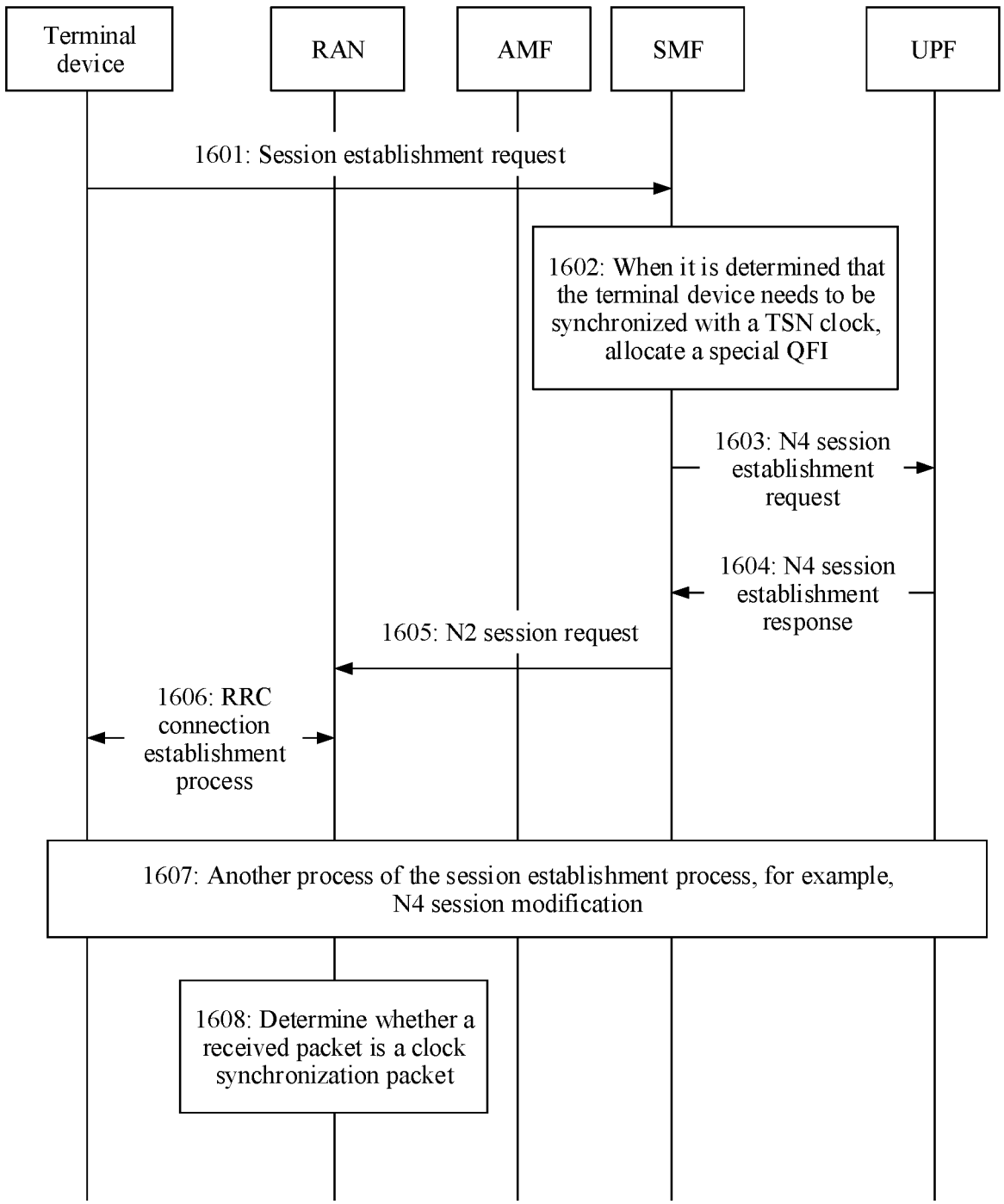
FIG. 16 is a schematic flowchart of an example of a method for identifying a clock synchronization packet according to an embodiment of this application.

FIG. 16 shows an example of a method for identifying a clock synchronization packet according to an embodiment of this application. It should be understood that FIG. 16 shows steps or operations of a method for identifying a packet, but the steps or operations are merely examples. In this embodiment of this application, other operations or variations of the operations in FIG. 16 may further be performed. In addition, the steps in FIG. 16 may be performed in a sequence different from that presented in FIG. 16, and possibly, not all the operations in FIG. 16 need to be performed.

1601. A terminal device sends a session establishment request to an SMF by using a RAN and an AMF. The session establishment request may include information such as a data network name (DNN) and single network slice selection assistance information (S-NSSAI).

Optionally, the terminal device may send fourth indication information to the SMF, where the fourth indication information indicates that the terminal device needs to be synchronized with a TSN clock.

1602: When determining that the terminal device needs to be synchronized with the TSN clock, the SMF allocates a special QFI to be used by a clock synchronization packet. In other words, a QoS flow packet corresponding to the special QFI is the clock synchronization packet. Herein, the special QFI may be, for example, the foregoing described first QFI, and the clock synchronization packet may be, for example, the PTP packet or the 802.1AS packet.

Specifically, the SMF may determine, based on at least one of the following, whether the terminal device needs to be synchronized with the TSN clock:
the fourth indication information in step 1601, or
subscription information, or
the DNN/the S-NSSAI.

For example, when the fourth indication information is carried in step 1601 and subscription is allowed, the SMF allocates the special QFI to be used by the clock synchronization packet. For another example, when the SMF determines that a DNN accessed by the terminal device needs to perform clock synchronization with a TSN clock source, the SMF allocates the special QFI to be used by the clock synchronization packet. For still another example, when the SMF determines that a slice (namely, the S-NSSAI) accessed by the terminal device needs to perform clock synchronization with a TSN clock source, the SMF allocates the special QFI to be used by the clock synchronization packet.

1603: The SMF sends an N4 session establishment request to the UPF. The N4 session establishment request carries a forwarding rule. The forwarding rule indicates the UPF to add the special QFI to the clock synchronization packet (for example, the PTP packet or the 802.1AS packet).

Herein, the forwarding rule may be, for example, the foregoing described policy information. The policy information is, for example, information such as a source address or a destination address. For example, when determining that a source address or a destination address of a received packet is consistent with address information in the forwarding rule, the UPF may determine that the packet is the clock synchronization packet. Then the UPF may add the special QFI to a packet header of the packet. The special QFI may further be used to indicate the RAN that the packet is the clock synchronization packet.

1604: The UPF returns an N4 session establishment response. The N4 session establishment response carries UPF tunnel information (tunnel info).

1605: The SMF sends an N2 session request to the RAN by using the AMF. The N2 session request carries N2 session management information (N2 SM info) and N1 session management information (N1 SM info). The N2 SM info includes the special QFI and the UPF tunnel information. The N1 SM info includes the special QFI and a packet filter.

1606: The RAN triggers a radio resource control (RRC) connection establishment process between the RAN and the terminal device. In this process, the RAN sends the N1 SM info obtained in step 1102 to the terminal device.

The RAN and the terminal device store a correspondence between the QFI and a radio bearer.

1607: Another process of session establishment. For example, the RAN returns an N4 session response to the SMF by using the AMF, where the N4 session response carries AN tunnel info. For another example, the SMF triggers a step, for example, N4 session modification between the SMF and the UPF.

1608: The RAN determines whether the received packet is the clock synchronization packet. In this embodiment of this application, the clock synchronization packet includes a downlink clock synchronization packet, for example, a SYNC packet.

For DL transmission:
When sending the clock synchronization packet, if the UPF determines that the packet is the clock synchronization packet according to the forwarding rule, the UPF encapsulates the special QFI for an outer layer of the packet, and sends the packet to the RAN.

The RAN receives a DL packet, determines that the DL packet is the clock synchronization packet based on the special QFI in the DL packet header, and then triggers a corresponding operation, such as downlink air interface delay measurement, N3 transmission delay measurement, and air interface uplink and downlink delay compensation. The RAN sends the DL packet to the terminal device.

The terminal device receives the DL packet, and identifies, based on a received radio bearer and the stored correspondence between the radio bearer and the QFI, that the received packet is correspondingly the special QFI, to further determine that the received packet is the clock synchronization packet, thereby performing corresponding processing such as recording an air interface time point of receiving the clock synchronization packet.

Optionally, the clock synchronization packet includes an uplink clock synchronization packet, for example, delay_req.

For UL transmission:

When sending the clock synchronization packet, the terminal device encapsulates the special QFI into the packet and sends the packet to the RAN, or the terminal device sends the packet to the RAN by using a radio bearer corresponding to the special QFI.

The RAN determines, based on the QFI in a packet header of the UL packet or based on the correspondence between the radio bearer and the QFI, that a UL packet is the clock synchronization packet, and then trigger a corresponding operation, such as determining a downlink air interface delay or an uplink air interface delay. The RAN sends the processed UL packet to the UPF.

The UPF receives the UL packet and performs corresponding processing, for example, recording a corresponding time point of receiving the UL packet.

It should be noted that, in this application, how a network element identifies the clock synchronization packet is described. However, it should be learned that identifying that the received packet is the clock synchronization packet is not a final purpose, and the final purpose is to trigger the corresponding operation, for example, determining the N3 transmission delay, determining the air interface transmission delay, or air interface uplink and downlink delay compensation. Therefore, the foregoing description may also be described as how to trigger the network element to perform the corresponding operation, for example, determining the N3 transmission delay or the air interface delay.

In this embodiment of this application, the SMF may alternatively allocate the special QFI to the clock synchronization packet in another manner. This is not limited in this embodiment of this application. In addition, the QFI may alternatively be another parameter, for example, a newly defined information element indicator. The indicator indicates that a packet is the clock synchronization packet. This is not limited in this embodiment of this application.

Therefore, in this embodiment of this application, the SMF may allocate the special QFI to the clock synchronization packet based on the indication information of the terminal device, the subscription information, the DNN/S-NSSAI, or the like. In addition, the SMF may send the QFI to the UPF, the RAN, and the terminal device, and deliver the forwarding rule to the UPF and the terminal device. In this way, the UPF can encapsulate the special QFI into the clock synchronization packet, or the terminal device transmits the clock synchronization packet on a radio channel corresponding to the special QFI, so that the RAN can identify the clock synchronization packet based on the special QFI or based on the radio channel on which the packet is transmitted.

In the 802.1AS protocol, the clock synchronization packet can be transmitted in a multicast mode. The 802.1AS packet includes domain information (domain), and indicates that the terminal device (or a TSN end station) performs time synchronization with a clock domain indicated by the domain. In this embodiment of this application, when receiving a multicast packet (for example, a SYNC packet), the UPF may determine, based on the clock domain corresponding to the terminal device (or the TSN end station), the terminal device (or the TSN end station) that needs to be synchronized. In other words, the UPF determines, based on the clock domain corresponding to the terminal device (or the TSN end station), the terminal device to which the 802.1AS packet is sent.

In this embodiment of this application, the UPF may obtain, by using the following steps 1 to 3, the clock domain corresponding to the terminal device (or the TSN end station).

Step 1: The SMF obtains the clock domain corresponding to the terminal device (or the TSN end station). Specifically, the SMF may obtain the clock domain corresponding to the terminal device (or the TSN end station) in the following general manner:

in a session establishment process, the terminal device sends a terminal device identifier (UE ID) and a domain ID to the SMF, or in a session establishment process, the SMF obtains, from a UDM, a correspondence between a UE ID and a domain ID, or in a session establishment process, the SMF obtains, from a PCF, a correspondence between a UE ID and a domain ID, or in a session establishment process, the SMF obtains, from a DN-AAA, a correspondence between a UE ID and a domain ID, or in a session establishment process, the SMF obtains, from an AMF, a correspondence between a UE ID and a domain ID.

The AMF may obtain the correspondence between the UE ID and the domain ID in the following manner:

in a registration process, the terminal device sends the terminal device identifier (UE ID) and the domain ID to the AMF, or in a registration process, the AMF obtains, from a UDM, the correspondence between the UE ID and the domain ID, or in a registration process, the AMF obtains, from a PCF, the correspondence between the UE ID and the domain ID.

Step 2: The SMF sends, to the UPF, the clock domain corresponding to the terminal device, that is, the SMF sends a correspondence between the terminal device and the clock domain to the UPF. The terminal device may be identified by using the UE ID, for example, a SUPI, a UE IP, or a UE MAC address. The clock domain is identified by using the domain ID.

It should be noted that the UE ID may alternatively be a TSN end station ID, for example, an APP ID. This is not limited in this embodiment of this application.

Step 3: The UPF obtains the correspondence between the UE ID and the domain ID.

Specifically, when receiving the 802.1AS packet, the UPF may determine a UE ID of a to-be-synchronized terminal device based on a domain ID in a header of the 802.1AS packet and the correspondence between the UE ID and the domain ID. Then, the UPF implements time synchronization between the terminal device and the clock domain by using the synchronization method in this embodiment of this application.

The foregoing mainly describes, from the perspective of interaction between different devices, the solution of the synchronization method provided in the embodiments of this application. It may be understood that to implement the foregoing functions, the UPF, the RAN, or the terminal device includes corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, functional unit division may be performed on the UPF, the RAN, the terminal device, or the like based on examples of the foregoing method, for example, functional units may be obtained through division based on corresponding functions, or two or more functions may be integrated into a processing unit. The integrated unit may be implemented in a form of hardware, or may be implemented in a form of a software functional unit. It should be noted that, in the embodiments of this application, division into units is an example, and is merely logical function division. During actual implementation, another division manner may be used.

Figure 17:
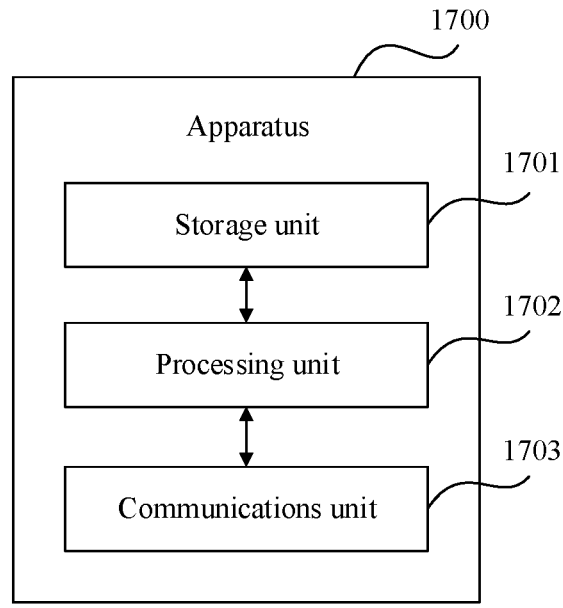
FIG. 17 is a schematic block diagram of a communications apparatus according to an embodiment of this application.

When the integrated unit is used, FIG. 17 is a possible schematic block diagram of a communications apparatus according to an embodiment of this application. The apparatus 1700 may be in a form of software, hardware, or a combination of software and hardware. FIG. 17 is the possible schematic block diagram of the apparatus according to this embodiment of this application. The apparatus 1700 includes: a processing unit 1702 and a communications unit 1703. The processing unit 1702 is configured to control and manage an action of the apparatus. The communications unit 1703 is configured to support communication between the apparatus and another device. The apparatus may further include a storage unit 1701 that is configured to store program code and data of the apparatus.

The apparatus 1700 shown in FIG. 17 may be the UPF, the RAN, or the terminal device in the embodiments of this application.

When the apparatus 1700 shown in FIG. 17 is the UPF, the processing unit 1702 can support the apparatus 1700 in performing the actions completed by the UPF in the foregoing method examples. For example, the processing unit 1702 supports the apparatus 1700 in performing step 609 in FIG. 6 and/or another process used for the technology described in this specification. The communications unit 1703 can support communication between the apparatus 1700 and the RAN, or the like. For example, the communications unit 1703 supports the apparatus 1700 in performing step 601, step 603, step 607, step 608, and step 611 in FIG. 6, step 701, step 702, and step 707 in FIG. 7, step 801, step 802, and step 806 in FIG. 8, step 1401, step 1407, and step 1409 in FIG. 14, step 1501 and step 1507 in FIG. 15, and/or another related communication process.

When the apparatus 1700 shown in FIG. 17 is the RAN, the processing unit 1702 can support the apparatus 1700 in performing the actions completed by the RAN in the foregoing method examples. For example, the processing unit 1702 supports the apparatus 1700 in performing step 606 in FIG. 6, step 706, step 708, and step 709 in FIG. 7, step 906 and step 907 in FIG. 9, step 1405, step 1408, and step 1410 in FIG. 14, step 1505, step 1511, and step 1510 in FIG. 15, and/or another process used for the technology described in this specification. The communications unit 1703 can support communication between the apparatus 1700 and the UPF, the terminal device, or the like. For example, the communications unit 1703 supports the apparatus 1700 in performing steps 603 to 605, step 611, and step 612 in FIG. 6, step 702, step 704, step 705, step 707, and step 710 in FIG. 7, step 802, step 803, step 806 and step 807 in FIG. 8, step 901, step 903, step 905, and step 908 in FIG. 9, step 1001 and step 1002 in FIG. 10, step 1401, step 1403, step 1404, step 1406, step 1407, step 1409, and step 1411 in FIG. 14, step 1501, step 1503, step 1509, and step 1512 in FIG. 15, and/or another related communication process.

When the apparatus 1700 shown in FIG. 17 is the terminal device, the processing unit 1702 can support the apparatus 1700 in performing the actions completed by the terminal device in the foregoing method examples. For example, the processing unit 1702 supports the apparatus 1700 in performing step 804, step 805, and step 808 in FIG. 8, steps 1004 to 1006 in FIG. 10, step 1412 in FIG. 14, step 1515 in FIG. 15, and/or another process used for the technology described in this specification. The communications unit 1703 can support communication between the apparatus 1700 and the RAN, the endpoint device, or the like. For example, the communications unit 1703 supports the apparatus 1700 in performing step 604, step 605, and step 612 in FIG. 6, step 704, step 705, and step 710 in FIG. 7, step 803 and step 807 in FIG. 8, step 903, step 905, and step 908 in FIG. 9, step 1002 in FIG. 10, step 1403, step 1404, step 1406, and step 1411 in FIG. 14, step 1503, step 1509 and step 1514 in FIG. 15, and/or another related communication process.

For example, the processing unit 1702 may be a processor or a controller, for example, may be a central processing unit (CPU), a general-purpose processor, a digital signal processor (DSP), an application-specific integrated circuit (ASIC), a field programmable gate array (FPGA), or another programmable logic device, a transistor logic device, a hardware component, or a combination thereof. The processing unit 1702 may implement or execute example logical blocks, units, and circuits described with reference to content disclosed in this application. The processor may alternatively be a combination implementing a computing function, for example, a combination of one or more microprocessors or a combination of a DSP and a microprocessor. The communications unit 1703 may be a communications interface, and the communications interface is a general term. During specific implementation, the communications interface may include one or more interfaces. The storage unit 1701 may be a memory.

Figure 18:
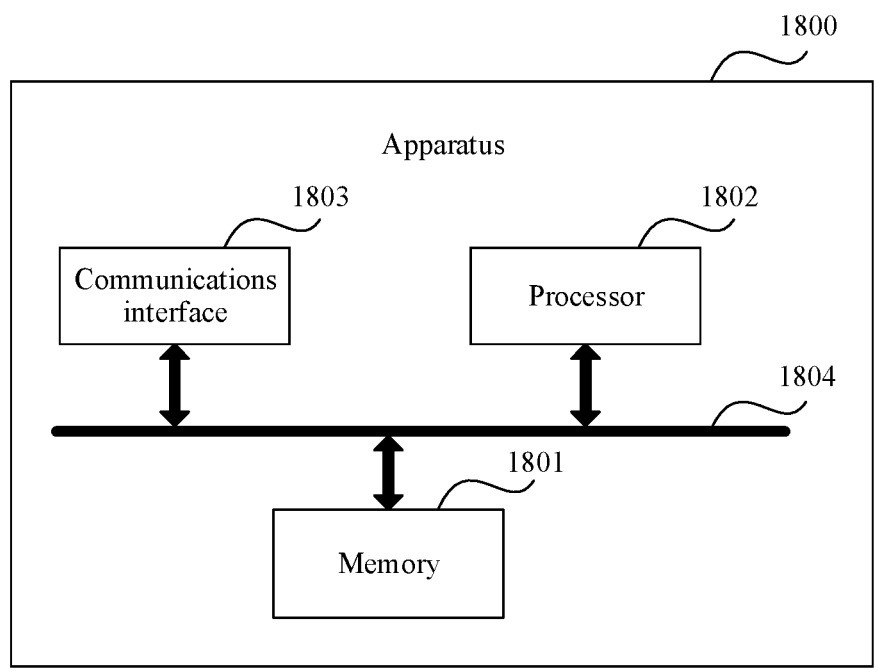
FIG. 18 is a schematic block diagram of another communications apparatus according to an embodiment of this application.

When the processing unit 1702 is a processor, the communications unit 1703 is a communications interface, and the storage unit 1701 is a memory, the apparatus 1700 in this embodiment of this application may be a communications apparatus 1800 shown in FIG. 18.

Referring to FIG. 18, the apparatus 1800 includes a processor 1802 and a communications interface 1803. Further, the apparatus 1800 may include a memory 1801. Optionally, the apparatus 1800 may further include a bus 1804. The communications interface 1803, the processor 1802, and the memory 1801 may be connected to each other by using the bus 1804. The bus 1804 may be a peripheral component interconnect (PCI) bus, an extended industry standard architecture (EISA) bus, or the like. The bus 1804 may be classified into an address bus, a data bus, a control bus, and the like. For ease of representation, only one thick line is used to represent the bus in FIG. 18, but this does not mean that there is only one bus or only one type of bus.

The processor 1802 may perform various functions of the apparatus 1800 by running or executing a program stored in the memory 1801.

For example, the communications apparatus 1800 shown in FIG. 18 may be the UPF, the RAN, or the terminal device in the embodiments of this application.

When the apparatus 1800 is the UPF, the processor 1802 may perform, by running or executing the program stored in the memory 1801, the actions completed by the UPF in the foregoing method examples. When the apparatus 1800 is the RAN, the processor 1802 may perform, by running or executing the program stored in the memory 1801, the actions completed by the RAN in the foregoing method examples. When the apparatus 1800 is the terminal device, the processor 1802 may perform, by running or executing the program stored in the memory 1801, the actions completed by the terminal device in the foregoing method examples.

A time-aware system may be classified into two types: a time-aware endpoint device (time-aware end station) and a time-aware relay. The time-aware end station is, for example, the endpoint device 301 in FIG. 3, the endpoint device 401 in FIG. 4, or the endpoint device 1301 in FIG. 13. The time-aware relay is, for example, the relay network 31 (namely, the time-aware relay 31) in FIG. 3 or the relay network 41 (namely, the time-aware relay 41) in FIG. 4. This is not limited in this embodiment of this application.

A time-aware system can support a plurality of clock domains. Specifically, a TSN network may include a plurality of clock domains, for example, a domain 0 and a domain 1, where different clock domains are connected to different clock sources. The different clock sources have different time start points or different time intervals. In addition, a TSN bridge (for example, a time-aware relay) and a TSN end station (for example, a time-aware end station) in a TSN network may simultaneously belong to different clock domains.

The time-aware endpoint device is a start point or an end point of time synchronization in the TSN network. When a time-aware endpoint device is not a grand master clock (namely, a clock source), the time-aware endpoint device is an end point of time synchronization, and is configured to receive time information. When a time-aware endpoint device is a grand master clock, the time-aware endpoint device is a start point of time synchronization, and is configured to send time information.

During time synchronization, the grand master clock sends a clock synchronization message to all directly connected time-aware systems, where the clock synchronization message includes current time. Each time-aware system that receives the clock synchronization message corrects time, and compensates for a transmission delay and a processing delay. When the time-aware system is a time-aware relay, the time-aware relay sends a corrected delay to all other directly connected time-aware systems. Specifically, for time correction, refer to the foregoing description.

It can be learned that, in the 802.1AS protocol, a clock synchronization packet can be transmitted in a multicast mode. The clock synchronization message may be a SYNC message, a delay_req message, a pdelay_req message, a pdelay_resp message, a follow_up message, or the like. This is not limited in this embodiment of this application. A packet header of the clock synchronization message includes a domain number field, where the field indicates a clock domain to which a clock sending time information belongs. In this embodiment of this application, the domain number field in the packet header may also be referred to as a domain identifier (domain ID) field.

Figure 19:
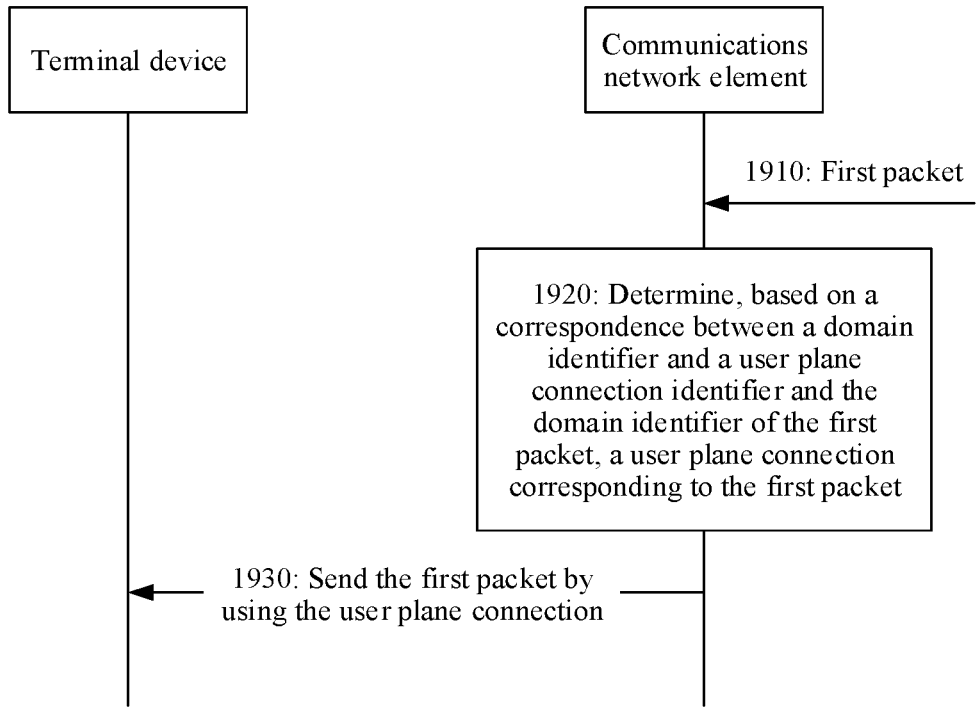
FIG. 19 is a schematic flowchart of a method for sending a packet according to an embodiment of this application.

FIG. 19 shows a method for sending a packet according to an embodiment of this application, so that a mobile network can support transfer of a multicast packet. The method shown in FIG. 19 includes steps 1910 to 1930. A communications network element is a network element, for example, a UPF or a RAN, in the mobile network.

1910: The communications network element receives a first packet. The first packet includes a domain identifier. The domain identifier identifies a clock domain to which a node device sending the first packet belongs.

1920: The communications network element determines, based on a correspondence between a domain identifier and a user plane connection identifier and further based on the domain identifier in the first packet, a user plane connection corresponding to the first packet.

1930: The communications network element sends the first packet to a terminal device by using the user plane connection corresponding to the first packet.

Therefore, in this embodiment of this application, the communications network element in the mobile network may determine, based on the correspondence between the domain identifier (domain ID) and the user plane connection identifier and the domain identifier in the first packet, the user plane connection corresponding to the first packet, and then send the first packet to the terminal device by using the user plane connection. The first packet is a multicast packet. Therefore, in this embodiment of this application, the communications network element in the mobile network can send the multicast packet.

Optionally, the communications network element receives, from an SMF, the correspondence between the domain identifier and the user plane connection identifier.

Figure 20:
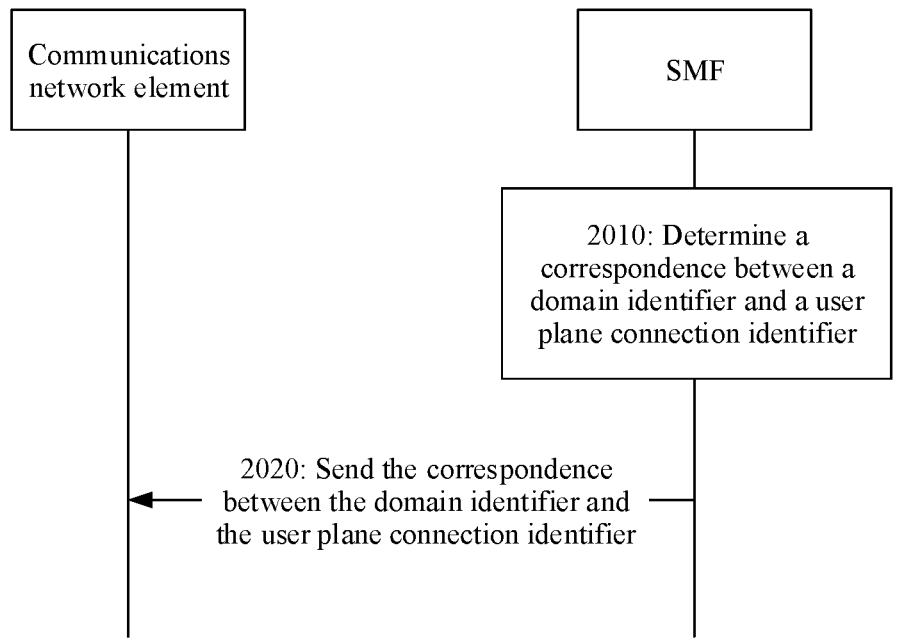
FIG. 20 is a schematic flowchart of a method for sending a packet according to an embodiment of this application.

FIG. 20 shows a method for sending a packet according to an embodiment of this application, so that a mobile network can support transfer of a multicast packet. The method shown in FIG. 20 includes steps 2010 and 2020. A communications network element is a network element, for example, a UPF or a RAN, in the mobile network.

2010: An SMF determines a correspondence between a domain identifier and a user plane connection identifier. The domain identifier identifies a clock domain to which a node device sending a first packet belongs.

2020: The SMF sends the correspondence between the domain identifier and the user plane connection identifier to the communications network element. The correspondence is used by the communications network element to determine a user plane connection used to send the first packet to a terminal device.

Therefore, in this embodiment of this application, the SMF sends the correspondence between the domain identifier and the user plane connection to the communications network element, so that the communications network element can determine, based on the correspondence, the user plane connection used to send the first packet, and then send the first packet to the terminal device by using the user plane connection. The first packet is a multicast packet. Therefore, in this embodiment of this application, the communications network element in the mobile network can send the multicast packet.

Optionally, that an SMF determines a correspondence between a domain identifier and a user plane connection identifier includes the following steps.

The SMF obtains a correspondence between a terminal device identifier and the user plane connection identifier.

The SMF obtains a correspondence between the terminal device identifier and the domain identifier. The domain identifier identifies a clock domain corresponding to the terminal device.

The SMF determines the correspondence between the domain identifier and the user plane connection identifier based on the correspondence between the terminal device identifier and the user plane connection identifier and the correspondence between the terminal device identifier and the domain identifier.

Optionally, that an SMF determines a correspondence between a domain identifier and a user plane connection identifier includes the following steps.

The SMF obtains a correspondence between the user plane connection identifier of the terminal device and a network identifier. The network identifier identifies a network accessed by the terminal device.

The SMF obtains a correspondence between the network identifier and the domain identifier. The domain identifier identifies a clock domain corresponding to the terminal device.

The SMF determines the correspondence between the domain identifier and the user plane connection identifier based on the correspondence between the user plane connection identifier and the network identifier and the correspondence between the network identifier and the domain identifier.

Optionally, the network identifier includes at least one of the following: a data network name DNN and single network slice selection assistance information S-NSSAI.

Optionally, in this embodiment of this application, the first packet is a clock synchronization packet.

Optionally, in this embodiment of this application, the user plane connection identifier includes at least one of the following: a session identifier and user plane tunnel information.

Figure 21:
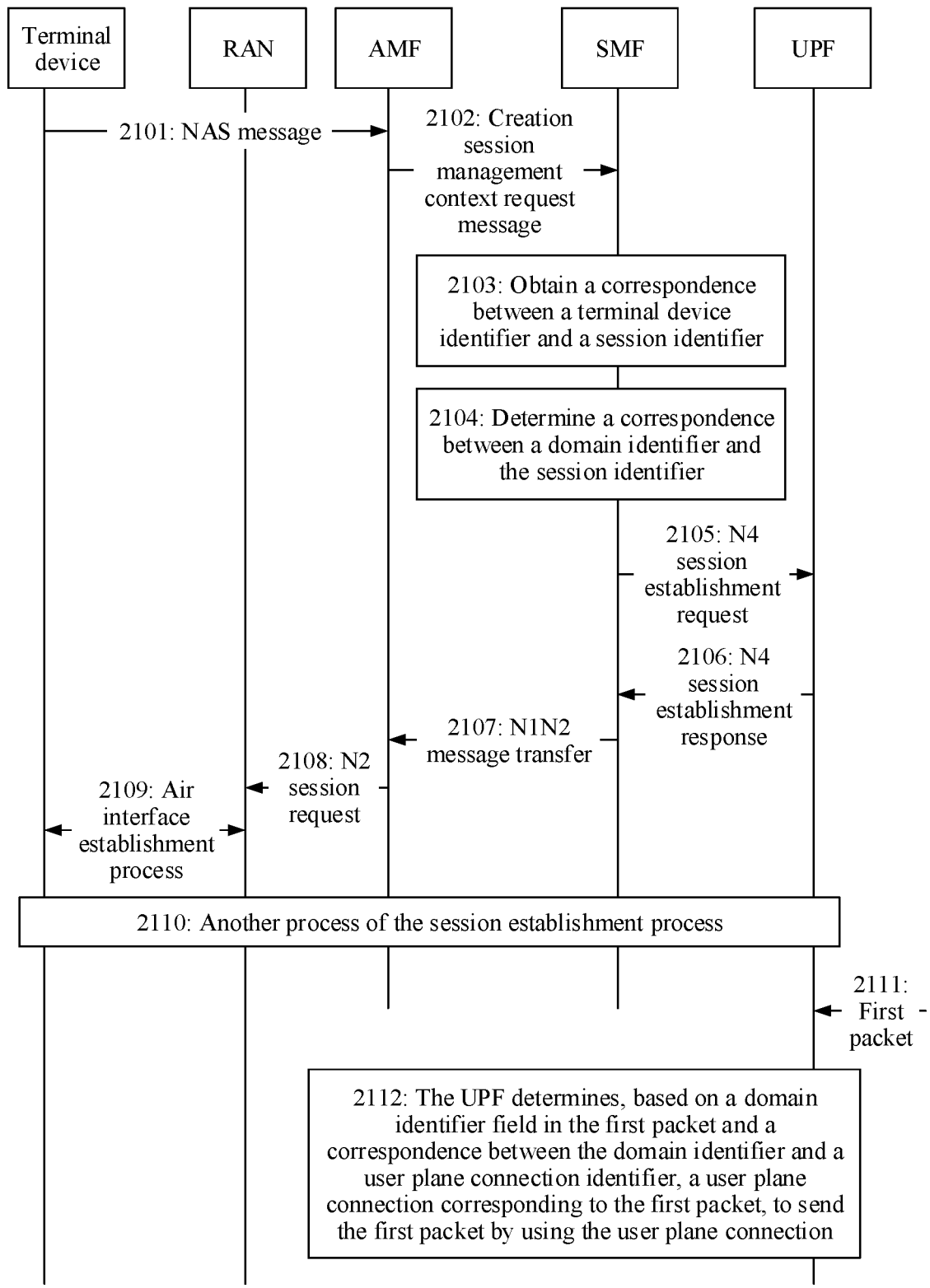
FIG. 21 is a schematic flowchart of an example of sending a packet according to an embodiment of this application.

FIG. 21 shows an example of sending a packet according to an embodiment of this application. In this embodiment of this application, a UPF determines, based on a correspondence between a domain identifier (domain ID) and a user plane connection identifier and the domain identifier in a first packet, a user plane connection corresponding to the first packet, and then sends the first packet to a terminal device by using the user plane connection. For example, this embodiment of this application may be applied to the scenario in FIG. 3.

It should be understood that FIG. 21 shows steps or operations of a method for sending a packet, but the steps or operations are merely examples. In this embodiment of this application, other operations or variations of the operations in FIG. 21 may further be performed. In addition, the steps in FIG. 21 may be performed in a sequence different from that presented in FIG. 21, and possibly, not all the operations in FIG. 21 need to be performed.

2101: The terminal device sends a NAS message to an AMF by using a RAN. The NAS message carries a session identifier (session ID), a DNN, S-NSSAI, a session establishment request, and the like.

Optionally, the NAS message may further carry a correspondence between a terminal device identifier and the domain ID. Herein, the terminal device identifier may be a media access control (MAC) address, a subscription permanent identifier (SUPI), a generic public subscription identifier (GPSI), or an Internet protocol (IP) address, and the like of the terminal device. This is not limited in this embodiment of this application.

2102: The AMF sends a creation session management context request message to an SMF. The creation session management context request message carries the SUPI of the terminal device and the parameters in step 2101.

Optionally, when the NAS message carries the correspondence between the terminal device identifier and the domain ID, the creation session management context request message further carries the correspondence between the terminal device identifier and the domain ID.

2103: The SMF obtains a correspondence between the terminal device identifier and the session identifier based on the creation session management context request message.

Optionally, the SMF herein may further obtain a correspondence between the session identifier of the terminal device and a network identifier based on the creation session management context request messsage. In this embodiment of this application, the network identifier is, for example, at least one of the following: a data network name DNN and single network slice selection assistance information S-NSSAI, or another identifier used to identify a network accessed by the terminal device. This is not limited in this embodiment of this application.

Optionally, the SMF may further store the obtained correspondence.

Optionally, in this embodiment of this application, when determining that the terminal device needs to perform clock synchronization, the SMF may allocate a special QFI to be used by a clock synchronization packet. In other words, a QoS flow packet corresponding to the special QFI is the clock synchronization packet. In this case, the SMF may store a correspondence between the session ID and the special QFI.

2104: The SMF determines a correspondence between the domain ID and the session identifier.

Specifically, in an implementation, the SMF may determine the correspondence between the domain identifier and the session identifier based on the correspondence between the terminal device identifier and the session identifier and the correspondence between the terminal device identifier and the domain identifier.

Optionally, the SMF may obtain the correspondence that is between the terminal device identifier and the domain ID and that is carried in the creation session management context request message.

Optionally, the SMF may alternatively obtain, from a UDM, the correspondence between the terminal device identifier and the domain ID, or the SMF may obtain, from a DN-AAA, the correspondence between the terminal device identifier and the domain ID.

For example, the terminal device accesses a network by using a session 1, and the SMF store a correspondence between terminal device MAC and the session 1. The SMF may obtain, from the UDM, a correspondence between the terminal device MAC and a domain 1. Therefore, the SMF may determine a correspondence between the session 1 and the domain 1. As shown in the following Table 1 and Table 2:

TABLE 1

| A correspondence that is between the terminal device ID and the domain ID and that is obtained by the SMF | |
| --- | --- |
| Terminal device MAC | Domain 1 |

TABLE 2

| A correspondence that is between the terminal device ID and the session ID and that is obtained by the SMF | |
| --- | --- |
| Terminal device MAC | Session 1 |

Optionally, the terminal device in the foregoing example may satisfy the following limiting conditions: one terminal device MAC can access only one domain, and one terminal device can establish only one session.

In another implementation, the SMF may determine the correspondence between the domain identifier and the session identifier based on the correspondence between the session identifier and the network identifier and the correspondence between the network identifier and the domain identifier.

Specifically, the SMF may obtain the correspondence between the network identifier and the domain identifier in the following manner: (1) the correspondence between the network identifier and the domain ID is configured on the SMF, or (2) the SMF obtains, from the UDM, the correspondence between the network identifier and the domain ID. Further, the SMF obtains a correspondence among the terminal device identifier, the network identifier, and the domain ID. Then, the SMF determines the correspondence between the domain identifier and the session identifier based on the correspondence that is between the session identifier and the network identifier and that is stored in step 2103.

For example, the terminal device establishes three sessions, which are separately a session 1, a session 2, and a session 3. The terminal device accesses a DNN 1, a DNN 2, and a DNN 3 respectively by using the three sessions. In addition, the DNN 1 corresponds to the domain 1, the DNN 2 corresponds to the domain 2, and the DNN 3 corresponds to the domain 3. In a session establishment process, the SMF stores correspondences between the DNNs and the session identifiers. The correspondences are shown in Table 3. Correspondences among the terminal device MAC, the DNNs, and the domain identifiers are configured on the SMF. The correspondences are shown in Table 4. Therefore, the SMF may determine correspondences between the session identifiers (session ID) and the domain identifiers (domain ID) based on Table 3 and Table 4. The correspondences are shown in Table 5.

TABLE 3

Correspondences stored in the SMF

| Session 1 | DNN 1 |
| Session 2 | DNN 2 |
| Session 3 | DNN 3 |

TABLE 4

Correspondences obtained/configured by the SMF

| Terminal device MAC | DNN 1 | Domain 1 |
| Terminal device MAC | DNN 2 | Domain 2 |
| Terminal device MAC | DNN 3 | Domain 3 |

TABLE 5

Session IDs and domain IDs determined by the SMF

| Session 1 | Domain 1 |
| Session 2 | Domain 2 |
| Session 3 | Domain 3 |

Optionally, the terminal device in the foregoing example may satisfy the following limiting conditions: one terminal device MAC may access at least one domain, and one terminal device MAC may establish at least one session, but one DNN may correspond to only one domain.

Optionally, in this embodiment of this application, when the SMF allocates the special QFI, the SMF may determine the correspondence among the session identifier, the QFI, and the domain ID.

2105: The SMF sends an N4 session establishment request to the UPF.

Optionally, the N4 session establishment request carries the correspondence between the domain ID and the user plane connection identifier. Herein, the user plane connection identifier refers to an N4 session identifier (N4 session ID). The N4 session ID corresponds one-to-one to the session ID.

Optionally, the N4 session establishment request may carry the correspondence among the domain ID, the special QFI, and the user plane connection identifier.

Further, the N4 session establishment request further carries a packet detection rule, a usage reporting rule, and the like. The packet detection rule may include the special QFI.

Further, when the SMF allocates tunnel information, the N4 session establishment request further carries core network tunnel information (CN tunnel info). In this case, the user plane connection identifier may be any one or more of the following: the N4 session identifier and the core network tunnel information.

2106: The UPF returns an N4 session establishment response to the SMF.

When the UPF allocates the tunnel information, the N4 session establishment response carries the core network tunnel information.

2107: The SMF sends an N1N2 message transfer message to the AMF, where the N1N2 message transfer message carries a session ID, N2 SM info, N1 SM info, and the like.

The N2 SM info includes the session ID, the CN tunnel info, S-NSSAI, and the like. The N1 SM info includes a session establishment acceptance, the S-NSSAI, the DNN, and the like.

2108: The AMF sends an N2 session request to the RAN, where the N2 session request carries the parameters in step 2107.

2109: The RAN initiates an air interface establishment process between the RAN and the terminal device.

2110: Another process of the session establishment process. For example, the RAN returns an N2 session response and the SMF initiates an N4 session modification with the UPF.

A specific process is described as follows:

1. The RAN returns the N2 session response, where the N2 session response carries the session ID, access network tunnel information (RAN tunnel info), and the like.

2. The AMF sends an update session management context request to the SMF, where the update session management context request carries the parameters in step 1.

3. The SMF sends an N4 session modification request to the UPF, where the N4 session modification request carries the access network tunnel information.

Optionally, the N4 session modification request further carries the domain ID. The domain ID corresponds to the access network tunnel information.

Optionally, the N4 session modification request further carries the correspondence between the domain ID and the user plane connection identifier. Herein, the user plane connection identifier may be any one or more of the following: the access network tunnel information, the N4 session identifier, and the core network tunnel information.

That is, the correspondence between the domain ID and the user plane connection may be delivered in step 2104, or may be delivered in this step. Specifically, when the correspondence is delivered in different steps, the user plane connection has different specific values. For example, if the correspondence is delivered in step 2104, the user plane connection identifier may be at least one of the N4 session ID and the CN tunnel info. If the correspondence is delivered in this step 3, the user plane connection identifier may be at least one of the N4 session ID, the CN tunnel info, and the AN tunnel info.

4. The UPF returns an N4 session modification response.

2111: The UPF receives the first packet. The first packet is a multicast packet. Specifically, for example, the first packet is a clock synchronization packet.

2112: The UPF determines, based on the domain ID field in the first packet and a correspondence between the domain ID and the user plane connection identifier, a user plane connection corresponding to the first packet, to send the first packet to the terminal device by using the user plane connection.

Optionally, the UPF may encapsulate, at an outer layer of the clock synchronization packet, a special QFI corresponding to the user plane connection identifier, to indicate that the packet is a clock synchronization packet.

Therefore, in this embodiment of this application, after receiving the multicast packet, the UPF may determine, based on the domain ID in the multicast packet, the user plane connection corresponding to the packet, to send the multicast packet to the terminal device by using the user plane connection. In this embodiment of this application, the UPF does not need to first determine the to-be-synchronized terminal device, and processing logic is relatively simple.

Figure 22:
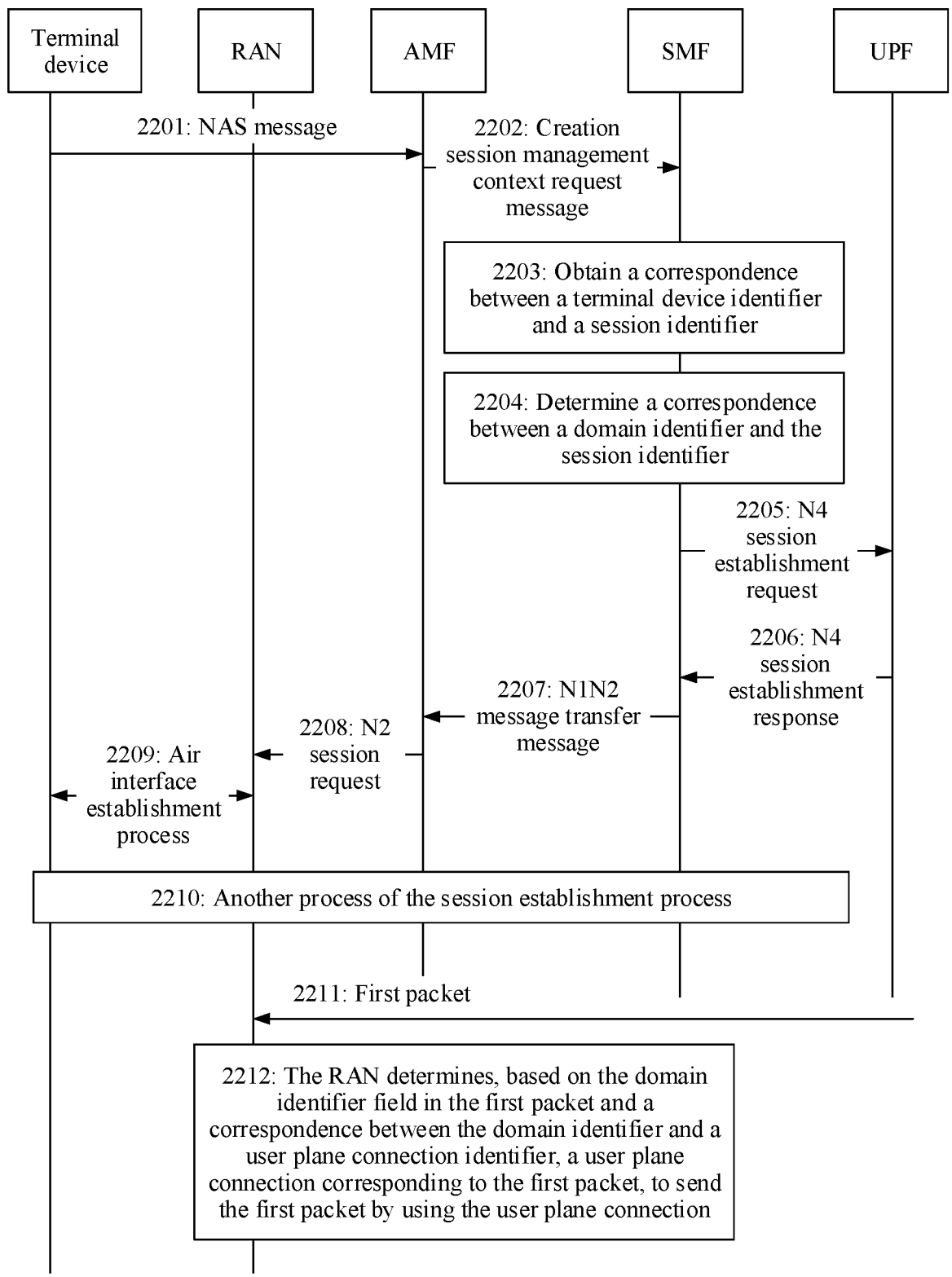
FIG. 22 is a schematic flowchart of an example of sending a packet according to an embodiment of this application.

FIG. 22 shows an example of sending a packet according to an embodiment of this application. In this embodiment of this application, a RAN determines, based on a correspondence between a domain identifier (domain ID) and a user plane connection identifier and the domain identifier in a first packet, a user plane connection corresponding to the first packet, and then sends the first packet to a terminal device by using the user plane connection. For example, this embodiment of this application may be applied to the scenario in FIG. 4.

It should be understood that FIG. 22 shows steps or operations of a method for sending a packet, but the steps or operations are merely examples. In this embodiment of this application, other operations or variations of the operations in FIG. 22 may be further performed. In addition, the steps in FIG. 22 may be performed in a sequence different from that presented in FIG. 22, and possibly, not all the operations in FIG. 22 need to be performed.

2201: The terminal device sends a NAS message to an AMF by using a RAN. The NAS message carries a session identifier (session ID), a DNN, S-NSSAI, a session establishment request, and the like.

2202: The AMF sends a creation session management context request message to an SMF. The creation session management context request message carries the SUPI of the terminal device and the parameter in step 2201.

2203: The SMF obtains a correspondence between the terminal device identifier and the session identifier based on the creation session management context request message.

2204: The SMF determines a correspondence between the domain ID and the session identifier.

Specifically, for steps 2201 to 2204, refer to the description in steps 2101 to 2104 in FIG. 21. For brevity, details are not described herein again.

2205: The SMF sends an N4 session establishment request to the UPF. The N4 session establishment request carries a packet detection rule, a reporting rule, and the like. The packet detection rule may include a special QFI.

When the SMF allocates tunnel information, the N4 session establishment request further carries core network tunnel information (CN tunnel info).

2206: The UPF returns an N4 session establishment response to the SMF.

When the UPF allocates the tunnel information, the N4 session establishment response carries the core network tunnel information.

2207: The SMF sends an N1N2 message transfer message to the AMF, where the N1N2 message transfer message carries a session ID, N2 SM info, N1 SM info, and the like.

The N2 SM info includes at least one of a QFI, a 5G quality of service identifier (5QI), the S-NSSAI, the session identifier, and the core network tunnel information.

The N1 SM info includes a session establishment acceptance, the S-NSSAI, the DNN, and the like.

In this embodiment of this application, the N2 SM info further carries the domain ID. Further, the N2 SM info carries the correspondence between the domain ID and the user plane connection identifier. Herein, the user plane connection identifier may be any one or more of the following: the session identifier, the core network tunnel information, the QFI, and the 5QI.

2208: The AMF sends an N2 session request to the RAN, where the N2 session request carries the parameters in step 2207.

2209: The RAN initiates an air interface establishment process between the RAN and the terminal device.

In this process, the RAN allocates an air interface user plane connection identifier. Specifically, the air interface user plane connection identifier may be a data radio bearer (DRB) ID. In this case, the RAN obtains a correspondence between the domain ID and the DRB ID. In other words, the RAN obtains the correspondence between the domain ID and the user plane connection identifier, and the user plane connection identifier may be the DRB ID.

2210: Another process of the session establishment process. For example, the RAN returns an N2 session response and the SMF initiates an N4 session modification with the UPF.

2211: The RAN receives the first packet. The first packet is a multicast packet, for example, a clock synchronization packet.

2212: The RAN determines, based on the domain ID field in the first packet and a correspondence between the domain ID and the user plane connection identifier, a user plane connection corresponding to the first packet, to send the first packet to the terminal device by using the user plane connection.

Therefore, in this embodiment of this application, after receiving the multicast packet, the RAN may determine, based on the domain ID in the multicast packet, the user plane connection corresponding to the packet, to send the multicast packet to the terminal device by using the user plane connection. In this embodiment of this application, the RAN does not need to first determine the to-be-synchronized terminal device, and processing logic is relatively simple.

The foregoing mainly describes, from the perspective of interaction between different devices, the solution of the method for sending a packet provided in the embodiments of this application. It may be understood that to implement the foregoing functions, the UPF, the RAN, or the SMF includes corresponding hardware structures and/or software modules for performing the functions. With reference to the units and algorithm steps described in the embodiments disclosed in this application, the embodiments of this application can be implemented in a form of hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the technical solutions of the embodiments of this application.

In the embodiments of this application, functional unit division may be performed on the UPF, the RAN, the SMF, or the like according to examples of the foregoing method, for example, functional units may be obtained through division based on corresponding functions, or two or more functions may be integrated into a processing unit. The integrated unit may be implemented in a form of hardware, or may be implemented in a form of a software functional unit. It should be noted that, in the embodiments of this application, division into units is an example, and is merely logical function division. During actual implementation, another division manner may be used.

Figure 23:
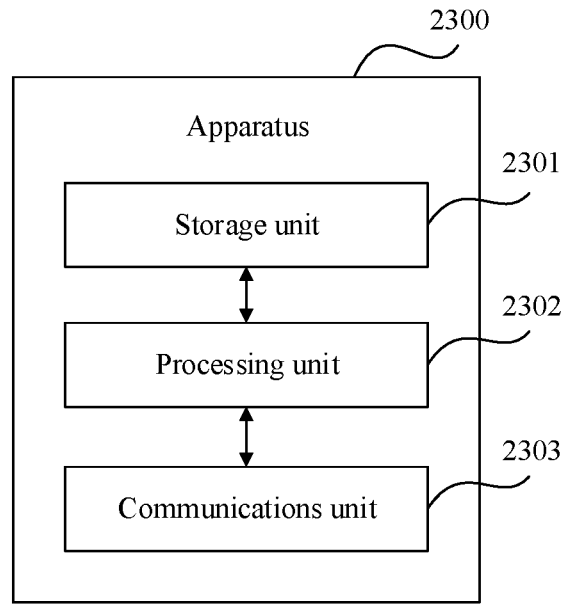
FIG. 23 is a schematic block diagram of a communications apparatus according to an embodiment of this application.

When the integrated unit is used, FIG. 23 is a possible schematic block diagram of a communications apparatus 2300 according to an embodiment of this application. The apparatus 2300 may be in a form of software, hardware, or a combination of software and hardware. FIG. 23 is the possible schematic block diagram of the apparatus according to this embodiment of this application. The apparatus 2300 includes: a processing unit 2302 and a communications unit 2303. The processing unit 2302 is configured to control and manage an action of the apparatus. The communications unit 2303 is configured to support communication between the apparatus and another device. The apparatus may further include a storage unit 2301 that is configured to store program code and data of the apparatus.

The apparatus 2300 shown in FIG. 23 may be the UPF, the RAN, or the SMF in the embodiments of this application.

When the apparatus 2300 shown in FIG. 23 is the UPF, the processing unit 2302 can support the apparatus 2300 in performing the actions completed by the UPF in the foregoing method examples. For example, the processing unit 2302 supports the apparatus 2300 in performing step 2112 in FIG. 21 and/or another process used for the technology described in this specification. The communications unit 2303 can support communication between the apparatus 2300 and the SMF, or the like. For example, the communications unit 2303 supports the apparatus 2300 in performing step 2105, step 2106, and step 2111 in FIG. 21, and/or another related communication process.

When the apparatus 2300 shown in FIG. 23 is the RAN, the processing unit 2302 can support the apparatus 2300 in performing the actions completed by the RAN in the foregoing method examples. For example, the processing unit 2302 supports the apparatus 2300 in performing step 2212 in FIG. 22, and/or another process used for the technology described in this specification. The communications unit 2303 can support communication between the apparatus 2300 and the UPF, the terminal device, or the like. For example, the communications unit 2303 supports the apparatus 2300 in performing step 2208 and step 2211 in FIG. 22, and/or another related communication process.

When the apparatus 2300 shown in FIG. 23 is the SMF, the processing unit 2302 can support the apparatus 2300 in performing the actions completed by the SMF in the foregoing method examples. For example, the processing unit 2302 supports the apparatus 2300 in performing step 2103 and step 2104 in FIG. 21, step 2203 and step 2204 in FIG. 22, and/or another process used for the technology described in this specification. The communications unit 2303 can support communication between the apparatus 2300 and the RAN, the endpoint device, or the like. For example, the communications unit 2303 supports the apparatus 2300 in performing step 2102, step 2105, step 2106, and step 2107 in FIG. 21, step 2202, step 2205, step 2206 and step 2207 in FIG. 22, and/or another related communication process.

For example, the processing unit 2302 may be a processor or a controller, for example, may be a CPU, a general-purpose processor, a DSP, an ASIC, a FPGA, or another programmable logic device, a transistor logic device, a hardware component, or a combination thereof. The processing unit 2302 may implement or execute example logical blocks, units, and circuits described with reference to content disclosed in this application. The processor may alternatively be a combination implementing a computing function, for example, a combination of one or more microprocessors or a combination of a DSP and a microprocessor. The communications unit 2303 may be a communications interface, and the communications interface is a general term. During specific implementation, the communications interface may include one or more interfaces. The storage unit 2301 may be a memory.

Figure 24:
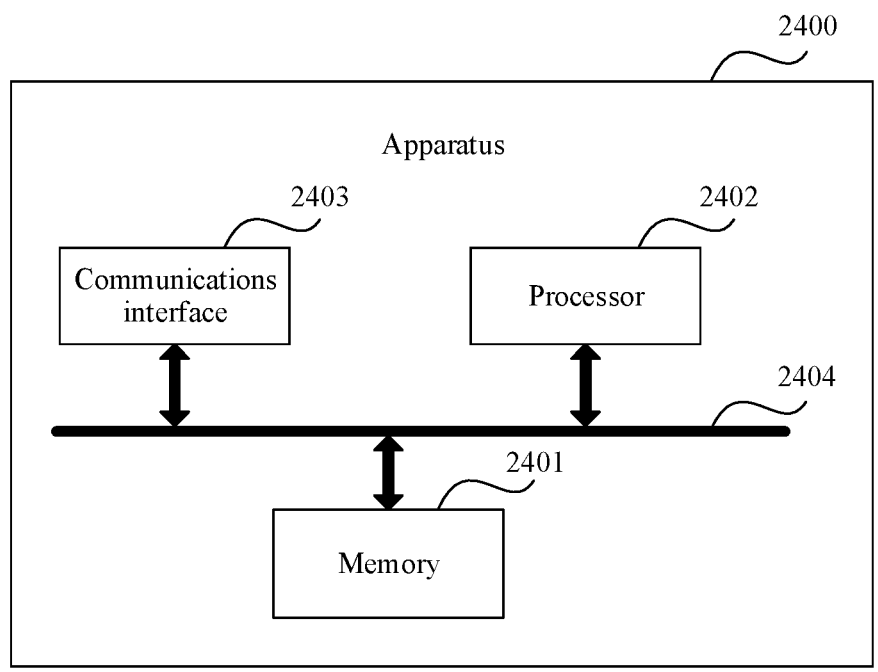
FIG. 24 is a schematic block diagram of another communications apparatus according to an embodiment of this application.

When the processing unit 2302 is a processor, the communications unit 2303 is a communications interface, and the storage unit 2301 is a memory, the apparatus 2300 in this embodiment of this application may be a communications apparatus 2400 shown in FIG. 24.

Referring to FIG. 24, the apparatus 2400 includes a processor 2402 and a communications interface 2403. Further, the apparatus 2400 may include a memory 2401. Optionally, the apparatus 2400 may further include a bus 2404. The communications interface 2403, the processor 2402, and the memory 2401 may be connected to each other by using the bus 2404. The bus 2404 may be a PCI bus, an EISA bus, or the like. The bus 2404 may be classified into an address bus, a data bus, a control bus, and the like. For ease of representation, only one thick line is used to represent the bus 2404 in FIG. 24, but this does not mean that there is only one bus or only one type of bus.

The processor 2402 may perform various functions of the apparatus 2400 by running or executing a program stored in the memory 2401.

For example, the communications apparatus 2400 shown in FIG. 24 may be the UPF, the RAN, or the terminal device in the embodiments of this application.

When the apparatus 2400 is the UPF, the processor 2402 may perform, by running or executing the program stored in the memory 2401, the actions completed by the UPF in the foregoing method examples. When the apparatus 2400 is the RAN, the processor 2402 may perform, by running or executing the program stored in the memory 2401, the actions completed by the RAN in the foregoing method examples. When the apparatus 2400 is the SMF, the processor 2402 may perform, by running or executing the program stored in the memory 2401, the actions completed by the SMF in the foregoing method examples.

An embodiment of this application further provides a computer-readable storage medium, including a computer program. When the computer program is run on a computer, the computer is enabled to perform the methods provided in the foregoing method embodiments.

An embodiment of this application further provides a computer program product including instructions. When the computer program product is run on a computer, the computer is enabled to perform the methods provided in the foregoing method embodiments.

An embodiment of this application further provides a chip. The chip may be used in a communications apparatus. The chip includes at least one processor. When the at least one processor executes instructions, the chip or the communications apparatus is enabled to perform the method provided in the foregoing method embodiment. Optionally, the chip may further include a memory, and the memory may be configured to store the related instructions.

It should be understood that, the processor mentioned in the embodiments of the present disclosure may be a CPU, or may be another general-purpose processor, a DSP, an ASIC, a FPGA or another programmable logic device, discrete gate, or transistor logic device, a discrete hardware component, or the like. The general-purpose processor may be a microprocessor, any conventional processor, or the like.

It should further be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

It should further be understood that first, second, and various numerical numbers in this specification are merely for differentiation for ease of description, but are not intended to limit the scope of this application.

A person of ordinary skill in the art may be aware that units, algorithms, and steps in the examples described with reference to the embodiments disclosed in this specification can be implemented by electronic hardware or a combination of computer software and electronic hardware. Whether the functions are performed in a manner of hardware or software depends on a particular application and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electronic form, a mechanical form, or another form.

Units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, functional units in the embodiments of this application may be integrated into one processing unit, or each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to a conventional technology, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a USB flash drive, a removable hard disk, a read-only memory (ROM), a random access memory (RAM), a magnetic disk, or an optical disc.

The foregoing description is merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for sending a packet, wherein the method comprises:
   receiving, by a communications network element, a first packet that comprises a domain identifier identifying a clock domain to which a node device sending the first packet belongs;
   determining, by the communications network element, a user plane connection corresponding to the first packet based on the domain identifier in the first packet; and
   sending, by the communications network element, the first packet to a terminal device using the user plane connection corresponding to the first packet.

2. The method according to claim 1, wherein the determining, by the communications network element, a user plane connection corresponding to the first packet based on the domain identifier in the first packet comprises:
   determining, by the communications network element, the user plane connection corresponding to the first packet based on the domain identifier in the first packet, and a correspondence between the domain identifier and an identifier of the user plane connection.

3. The method according to claim 2, wherein the method further comprises:
   receiving, by the communications network element from a session management function network element, the correspondence between the domain identifier and the identifier of the user plane connection.

4. The method according to claim 1, wherein the communications network element is a user plane function network element.

5. The method according to claim 1, wherein the first packet is a clock synchronization packet.

6. The method according to claim 1, wherein the user plane connection identifier comprises a session identifier.

7. A communications apparatus comprising:
a receiver configured to receive a first packet that comprises a domain identifier identifying a clock domain to which a node device sending the first packet belongs;
a processor configured to determine a user plane connection corresponding to the first packet based on the domain identifier in the first packet; and
a transmitter configured to send the first packet to a terminal device using the user plane connection corresponding to the first packet.

8. The apparatus according to claim 7, wherein the determining a user plane connection corresponding to the first packet based on the domain identifier in the first packet comprises:
determining the user plane connection corresponding to the first packet based on the domain identifier in the first packet, and a correspondence between the domain identifier and an identifier of the user plane connection.

9. The apparatus according to claim 8, wherein the receiver is further configured to:
receive, from a session management function, the correspondence between the domain identifier and the identifier of the user plane connection identifier.

10. The apparatus according to claim 7, wherein the apparatus is a user plane function network element or a radio access network (RAN) device.

11. The apparatus according to claim 7, wherein the first packet is a clock synchronization packet.

12. The apparatus according to claim 7, wherein the user plane connection identifier comprises at least one of the following: a session identifier and user plane tunnel information.

13. A computer-readable medium including computer-executable instructions that, when executed by a processor, facilitate carrying out a method for sending a packet, wherein the method comprises:
receiving, by a communications network element, a first packet that comprises a domain identifier identifying a clock domain to which a node device sending the first packet belongs;
determining, by the communications network element, a user plane connection corresponding to the first packet based on the domain identifier in the first packet; and
sending, by the communications network element, the first packet to a terminal device using the user plane connection corresponding to the first packet.

14. The computer-readable medium according to claim 13, wherein the method further comprises:
receiving, by the communications network element from a session management function network element, the correspondence between the domain identifier and the identifier of the user plane connection.

15. The computer-readable medium according to claim 13, wherein the communications network element is a user plane function network element.

16. The computer-readable medium according to claim 13, wherein the first packet is a clock synchronization packet.

17. The computer-readable medium according to claim 13, wherein the user plane connection identifier comprises a session identifier.

18. The computer-readable medium according to claim 13, wherein the determining, by the communications network element, a user plane connection corresponding to the first packet based on the domain identifier in the first packet comprises:
determining, by the communications network element, the user plane connection corresponding to the first packet based on the domain identifier in the first packet, and a correspondence between the domain identifier and an identifier of the user plane connection.

* * * * *